United States Patent
Chapin et al.

(10) Patent No.: US 11,231,704 B2
(45) Date of Patent: *Jan. 25, 2022

(54) CUMULATIVE COST MODEL FOR PREDICTING ASSET MAINTENANCE COST FROM DISTRESS MODELS

(71) Applicant: General Electric Company, Schenectady, NY (US)

(72) Inventors: Ryan Matthew Chapin, Cincinnati, OH (US); Raji Reddy, Dubai (AE)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/991,668

(22) Filed: Aug. 12, 2020

(65) Prior Publication Data

US 2021/0109513 A1    Apr. 15, 2021

Related U.S. Application Data

(63) Continuation of application No. 15/655,352, filed on Jul. 20, 2017, now Pat. No. 10,782,680.

(51) Int. Cl.
*G05B 23/02* (2006.01)
*G06Q 10/00* (2012.01)
*F01D 21/00* (2006.01)
*G06Q 10/04* (2012.01)
*F01D 17/02* (2006.01)

(52) U.S. Cl.
CPC ....... *G05B 23/0283* (2013.01); *F01D 21/003* (2013.01); *G06Q 10/04* (2013.01); *G06Q 10/20* (2013.01); *F01D 17/02* (2013.01); *F05D 2270/332* (2013.01)

(58) Field of Classification Search
None
See application file for complete search history.

(56) References Cited

U.S. PATENT DOCUMENTS 7,328,128 B2 * 2/2008 Bonanni ............ G05B 23/0251
                                                              702/182
7,457,785 B1 * 11/2008 Greitzer ................... G01D 1/18
                                                              706/12

(Continued)

FOREIGN PATENT DOCUMENTS

CN       104778635 A       7/2015
EP         2555154 A1      2/2013

(Continued)

OTHER PUBLICATIONS

Extended European Search Report and Opinion issued in connection with corresponding EP Application No. 18183164.5 dated Sep. 6, 2018, 7 Pages.

(Continued)

*Primary Examiner* — Lina M Cordero
(74) *Attorney, Agent, or Firm* — Amin, Turocy & Watson, LLP

(57) ABSTRACT

Distress models can be generated to model current or future deterioration of components. By correlating distress models with maintenance costs and material consumption, cumulative cost models and cumulative material models can be developed to optimize engine removal timing in order to maximize asset and portfolio value.

20 Claims, 21 Drawing Sheets

(56) References Cited

U.S. PATENT DOCUMENTS

| | | | |
|---|---|---|---|
| 7,548,830 B2 | 6/2009 | Goebel et al. | |
| 8,660,875 B2* | 2/2014 | Yedatore | G06F 11/2294 |
| | | | 705/7.12 |
| 8,712,739 B2* | 4/2014 | Jiang | F01D 21/003 |
| | | | 703/2 |
| 9,218,626 B1* | 12/2015 | Haller, Jr. | G06Q 10/0875 |
| 2005/0080660 A1* | 4/2005 | deSilva | G06Q 10/06314 |
| | | | 705/7.21 |
| 2007/0156496 A1* | 7/2007 | Avery | G06Q 10/087 |
| | | | 705/305 |
| 2009/0048730 A1* | 2/2009 | Akkaram | G07C 5/006 |
| | | | 701/31.4 |
| 2009/0204267 A1* | 8/2009 | Sustaeta | G06Q 10/04 |
| | | | 700/291 |
| 2011/0093158 A1 | 4/2011 | Theisen et al. | |
| 2012/0053984 A1* | 3/2012 | Mannar | G06Q 10/0635 |
| | | | 705/7.28 |
| 2012/0283963 A1 | 11/2012 | Mitchell et al. | |
| 2013/0173329 A1* | 7/2013 | Kolbet | G06Q 10/20 |
| | | | 705/7.25 |
| 2014/0052410 A1 | 2/2014 | Tralshawala et al. | |
| 2016/0034858 A1* | 2/2016 | Avery | G06Q 30/0283 |
| | | | 705/7.25 |
| 2016/0133066 A1* | 5/2016 | Lavie | G07C 5/08 |
| | | | 701/31.4 |
| 2016/0371657 A1 | 12/2016 | Butera | |
| 2017/0032281 A1 | 2/2017 | Hsu | |
| 2017/0083822 A1* | 3/2017 | Adendorff | G07C 5/006 |
| 2017/0205818 A1* | 7/2017 | Adendorff | G06Q 10/0635 |

FOREIGN PATENT DOCUMENTS

| | | |
|---|---|---|
| EP | 3 065 092 A1 | 9/2016 |
| WO | 2016/144586 A1 | 9/2016 |

OTHER PUBLICATIONS

Communication pursuant to Rule 69 EPC received for EP Patent Application Serial No. 18183164.5 dated Jan. 28, 2019, 2 pages.

Communication pursuant to Rule 94(3) EPC received for EP Patent Application Serial No. 18183164.5 dated Aug. 13, 2019, 6 pages.

Non-Final Office Action received for U.S. Appl. No. 15/655,352 dated Dec. 18, 2019, 70 pages.

Notice of Allowance received for U.S. Appl. No. 15/655,352 dated May 20, 2020, 45 pages.

First Office Action received for Chinese Patent Application Serial No. 201810809030.5 dated Oct. 11, 2021, 11 pages.

* cited by examiner

CUMULATIVE COST MODEL FOR PREDICTING ASSET MAINTENANCE COST FROM DISTRESS MODELS

CROSS-REFERENCE

This application is a continuation of and claims priority to U.S. patent application Ser. No. 15/655,352, filed Jul. 20, 2017, and entitled "CUMULATIVE COST MODEL FOR PREDICTING ASSET MAINTENANCE COST FROM DISTRESS MODELS." The entirety of the foregoing application listed herein is hereby incorporated by reference.

TECHNICAL FIELD

The subject disclosure relates to system(s) and/or method (s) to predict maintenance costs and material consumption, and more particularly to utilization of cumulative cost model(s) to predict asset maintenance costs from distress model(s).

BACKGROUND

As aircrafts fly in and out of certain locations around the world, they are respectively exposed to dust, salt, high temperatures, cross winds, vibration sources, etc. Distress models analyze operational data, environmental data, satellite data, etc., and seek to determine the number of times an engine, asset or part has been exposed to certain conditions. Such information is analyzed utilizing physics and domain expertise regarding how a part is designed to build an algorithm that predicts current state of distress as well as forecast timing of end of life. Such algorithm can provide an estimate of remaining number of instances a part can continue to be employed with same exposures before it needs to be serviced (e.g., prior to failure). However, repair and overhaul facilities are still often surprised by conditions of incoming components and have little visibility into estimated costs and material consumptions of individual assets.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products are described.

In an implementation, a system is provided to facilitate predicting asset maintenance costs. The system comprises a processor that executes computer executable components stored in memory. The system comprises a data aggregation component that receives data generated by a set of components and assets; a data science component that employs artificial intelligence (AI) and physical domain expertise to learn the data generated by the set of components and assets enabling building of at least one model of current or future distress levels of a subset of components and assets; and a correlation component that correlates material consumption, labor or resulting maintenance costs to current or future distress models of respective components or assets of a set to generate respective cumulative material and cumulative cost models that provide current or future material demand and cost predictions associated with expected maintenance of a subset of the respective components or assets.

In another implementation, the system comprises a collection component that collects and stores data relative to maintenance costs including labor, material consumption, transportation costs, material availability, repair availability or available capacity.

In another implementation, the system comprises a replacement component that enables ordering of replacement components and assets based on at least one cumulative material or cumulative cost model analysis.

In another implementation, the system comprises an avatar component that generates an avatar that interfaces with a user and provides suggestions to the user based on outputs of the cumulative cost models.

In yet another implementation, a method comprises employing a processor to execute computer executable components stored in a memory. The method comprises using a data aggregation component to receive data generated by a set of components and assets; using a data science component to employ artificial intelligence (AI) and physical domain expertise to learn the data generated by the set of components and assets enabling building of at least one model of current or future distress levels of a subset of components and assets; and using a correlation component to correlate material consumption, labor or resulting maintenance costs to current or future distress models of respective components or assets of a set to generate respective cumulative material and cumulative cost models that provide current or future material demand and cost predictions associated with expected maintenance of a subset of the respective components or assets.

In an implementation, a computer program product for predicting asset maintenance costs comprises a computer readable storage medium having program instructions embodied therewith, the program instructions are executable by a processor to cause the processor to use a data aggregation component that receives data generated by a set of components and assets; use a data science component that employs artificial intelligence (AI) and physical domain expertise to learn the data generated by the set of components and assets enabling building of at least one model of current or future distress levels of a subset of components and assets; and use a correlation component that correlates material consumption, labor or resulting maintenance costs to current or future distress models of respective components or assets of a set to generate respective cumulative material and cumulative cost models that provide current or future material demand and cost predictions associated with expected maintenance of a subset of the respective components or assets.

In some embodiments, elements described in connection with the computer-implemented method(s) can be embodied in different forms such as a system, a computer program product, or another form.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Industrial assets often have a small subset of components that drive maintenance intervals and costs. By pairing physics, data science and observation-based distress models with historic maintenance costs, embodiments predict current or future maintenance costs of individual and surrounding components within a complex system. It is contemplated that novel aspects described herein can be used to predict maintenance costs and material consumptions in fields other than aircraft. One or more implementations described herein provide owners and service providers the ability to predict real-time and future maintenance costs of their assets and enable material forecasting, limiting excess inventories maintained to cover work scope.

Figure 1:
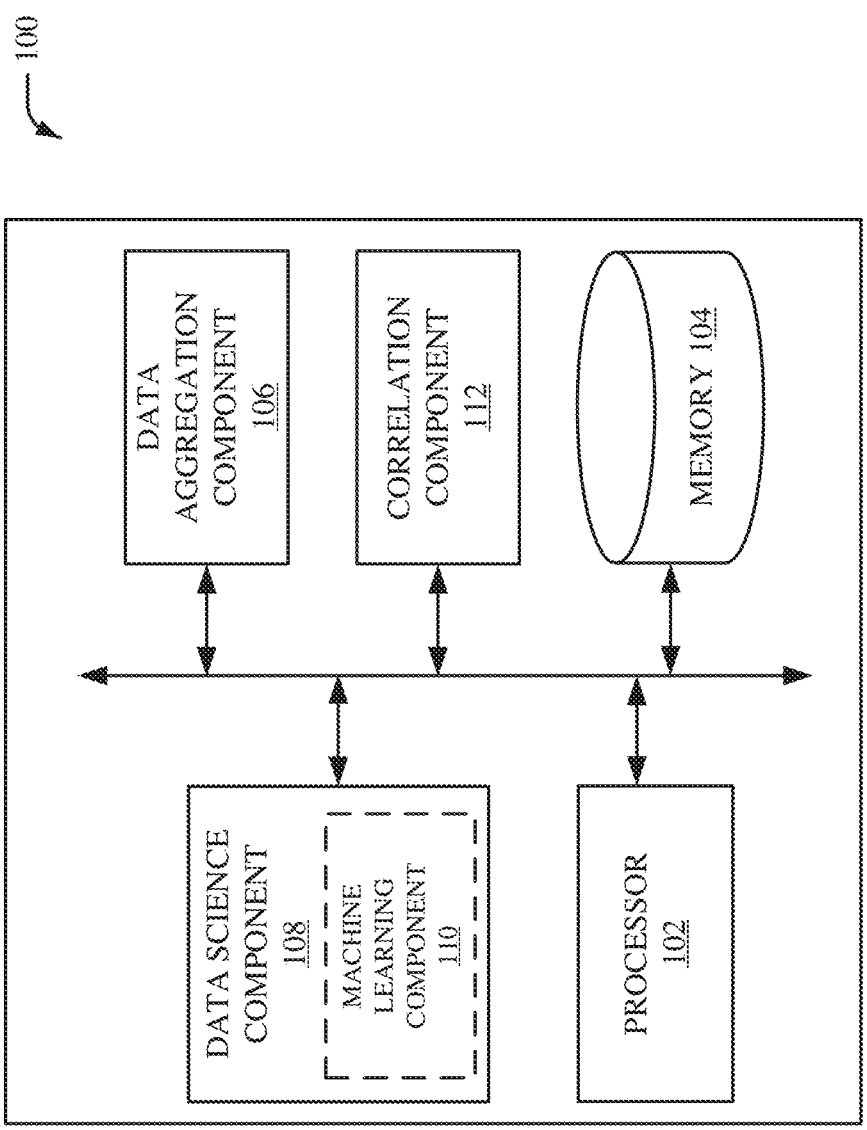
FIG. 1 illustrates a system that predicts asset maintenance cost(s) in accordance with one or more embodiments described herein.

FIG. 1 illustrates system 100 that predicts asset maintenance costs. The processor 102 executes computer executable components stored in the memory 104. The data aggregation component 106 receives data generated by components or parts of an aircraft, its engine or the like. For example, data can come from digital twin models which can monitor real-time or inferred condition of components by employing sensors installed on or in proximity to components. The data science component 108 or machine learning component 110 can utilize data received by the data aggregation component 106 to score and rank components for insights on optimal removal timing of components. The data science component 108 can include the machine learning component 110. Based on a part with particular exposures, a certain distress score can be predicted (e.g., inferred or determined) and the part can be expected to run through a given number of remaining cycles before it is required to be serviced (e.g., come off wing or be inspected for removal). Maintenance personnel can also conduct visual inspections and score components. Observational data can be obtained with or without the aid of equipment such as a borescope. Visual references can be provided to maintenance personnel as scoring standards.

An engine that was flying with a part that was removed can have a distress ranking model (DRM) score between 0 and 100. A zero represents a part that is brand new. A score of 100 represents a part that has failed. Anything in between represents different pedigrees of distress in connection with that part. Based on a given DRM score, a part has a number of predicted cycles before it should be serviced or replaced.

The data science component 108 or machine learning component 110 can score components based on a cumulative damage model (CDM), which seeks to determine the number of times an engine or a part has been exposed to a condition that led to accelerated distress. For example, dust collecting on a part can lead that part to become hotter in operation and such temperature rise can reduce life from that part. Every time an engine or a part is exposed to a condition, damage is calculated to accumulate at a certain rate according to the type and frequency of the particular exposure. An analysis can be conducted to predict the number of remaining exposures the part can withstand before it should to be serviced or even scrapped.

The data science component 108 or machine learning component 110 can analyze current CDM and DRM distress scores with historical data utilizing physics-based, big data or data science to build distress models. Big data would be operational, geographical, environmental, configuration and other data sets fused together. For example, atmospheric conditions that are measured once a day for an airport can serve as valuable data with reference to data analysis in connection with building a distress model. For example, if a dust storm was occurring on a particular day in a particular location, such discrete data can be relevant to factor into the broader data sets.

The data science component 108 or machine learning component 110 can employ artificial intelligence, physical domain expertise and other statistical methods to score and rank components and generate removal timing. The data science component 108 or machine learning component 110 can perform recursive learning across unstructured subsets of data. Digital twin models can comprise a neural network and a Baysesian network and can interact with one another.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect) described herein, one or more components can examine an entirety or a subset of data to which it is granted access and can provide for reasoning about or determine states of a system, environment, etc. from a set of observations as captured via events and/or data. Determinations can be employed to identify a specific context or action, and/or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The correlation component 112 can correlate these current or future distress models to historic material consumption, labor or resulting maintenance costs associated with assets serviced at similar distress levels to generate cumulative material models (CMM) and cumulative cost models (CCM). The correlation component 112 links the predictive capability of distress models with historical material, labor and resulting maintenance costs to predict current or future costs expected to incur. Given predicted component distress levels, material and maintenance costs can be predicted based on historical distress, material and cost relationships. By taking data from past engines that were removed with parts that have similar distress scores, subsequent materials and labor or maintenance costs that were required to restore the life of that part back to a serviceable condition can be predicted. If a part remains in operation and its distress scores increase, subsequent material and maintenance costs expected to incur can be predicted to accrue.

Figure 2:
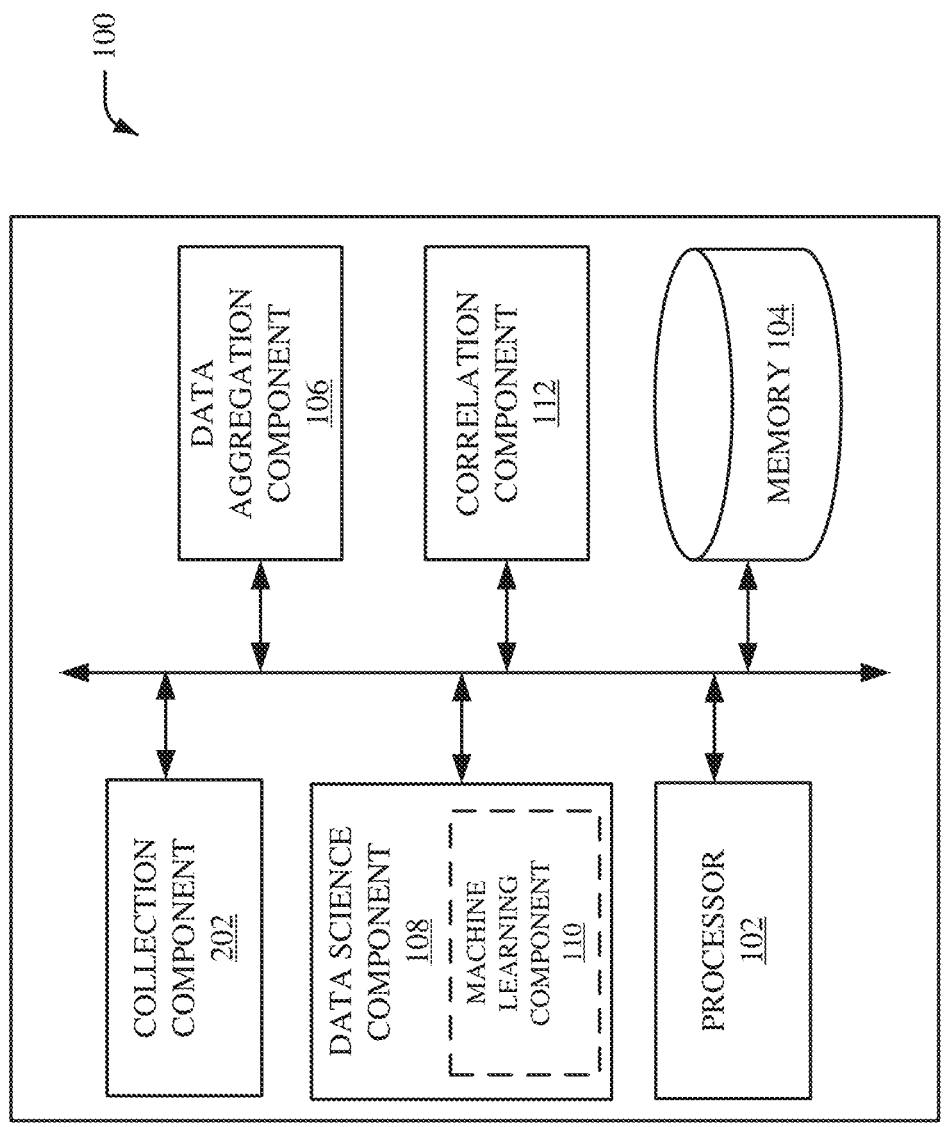
FIG. 2 illustrates a system that predicts asset maintenance cost(s) including a collection component in accordance with one or more embodiments described herein.

As depicted in FIG. 2, the system 100 can include the collection component 202 that collects and stores data relative to maintenance costs including labor, material consumption, transportation costs, material availability, repair availability or available capacity. It is contemplated that the collection component 202 can collect and store other data affecting maintenance costs such as hours of flight, routes, data science work, atmospheric data, satellite data, etc. Certain routes can put more stress on an aircraft engine than others. Such data can be utilized by the data science component 108 or machine learning component 110 to generate insights to factor in to the distress models.

Figure 3:
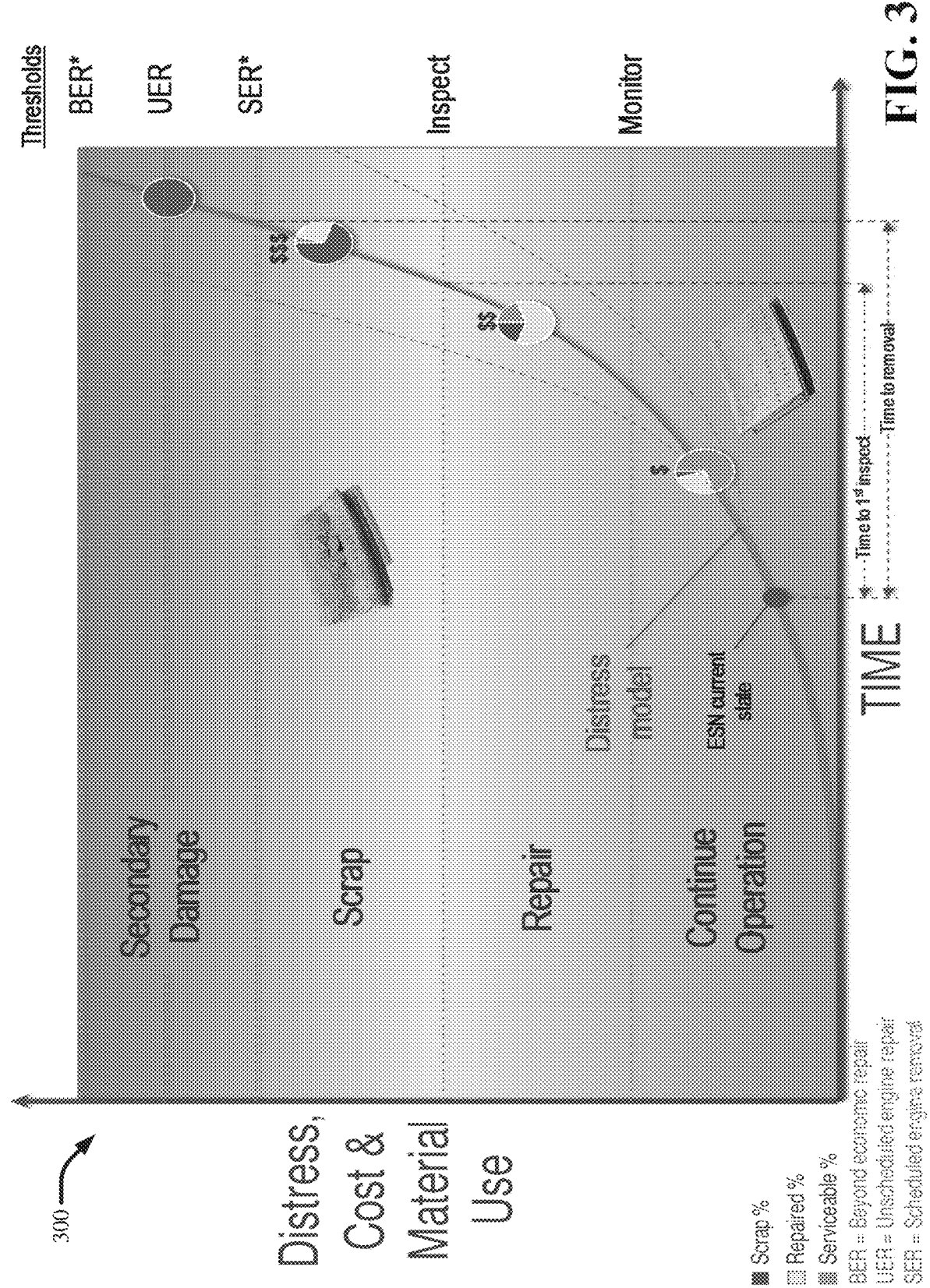
FIG. 3 illustrates an example, non-limiting chart correlating damage to part cost in accordance with one or more embodiments described herein.

FIG. 3 is an illustration of how damage correlates to part costs. The chart 300 depicts a part within a module within an engine on an aircraft. The chart 300 predicts life of a part within a complex asset. At the current state for that particular engine serial number (ESN), the disposition for that part looks good and can continue operation. If this part were to be exposed for maintenance today, the part does not need to be scrapped or repaired and a very low cost is incurred. Over time, as the part moves along the curve into the repair zone, the part would need to be serviced or repaired. If a replacement part is available, that part needing service or repair can be refurbished and the aircraft can continue operation once again. A part that is repairable or serviceable can be sold on the open market for someone who is in the market for a used part.

However, had the part continued flying longer moving along the curve into the scrap zone, a certain percentage of a set of individual parts will need to be scrapped. Eventually, the set of parts will go from partially scrapped to 100% scrapped. If a part is allowed to continue operation and causes secondary damage, beyond having to pay for the cost of that part, it could incur additional cost for downstream parts. For example, a damaged part that releases broken pieces in a flow path can cause damage to other parts along the path.

Figure 4:
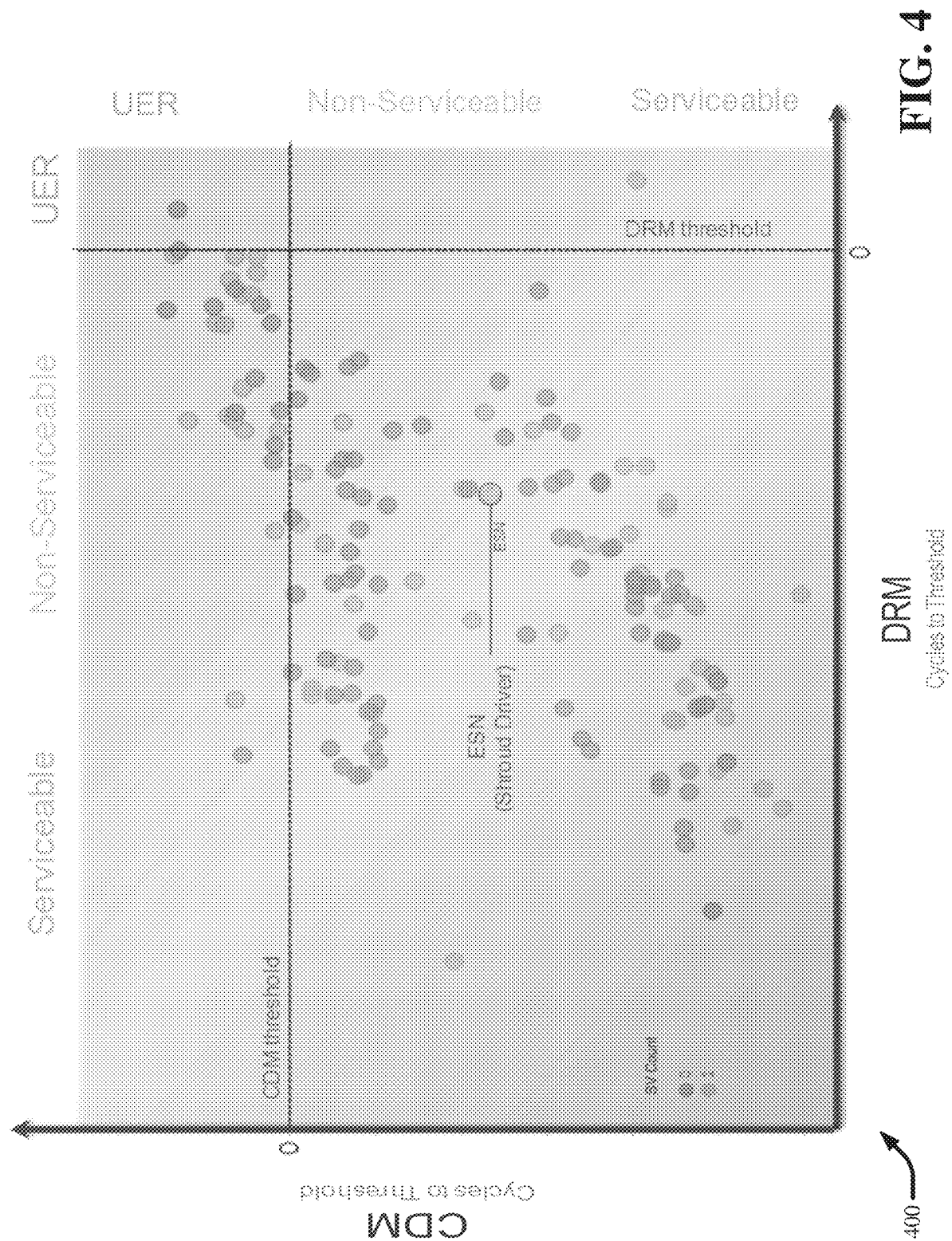
FIG. 4 illustrates an example, non-limiting scatter diagram of cumulative damage model cycles to threshold versus distress ranking model cycles to threshold in accordance with one or more embodiments described herein.
Figure 5:
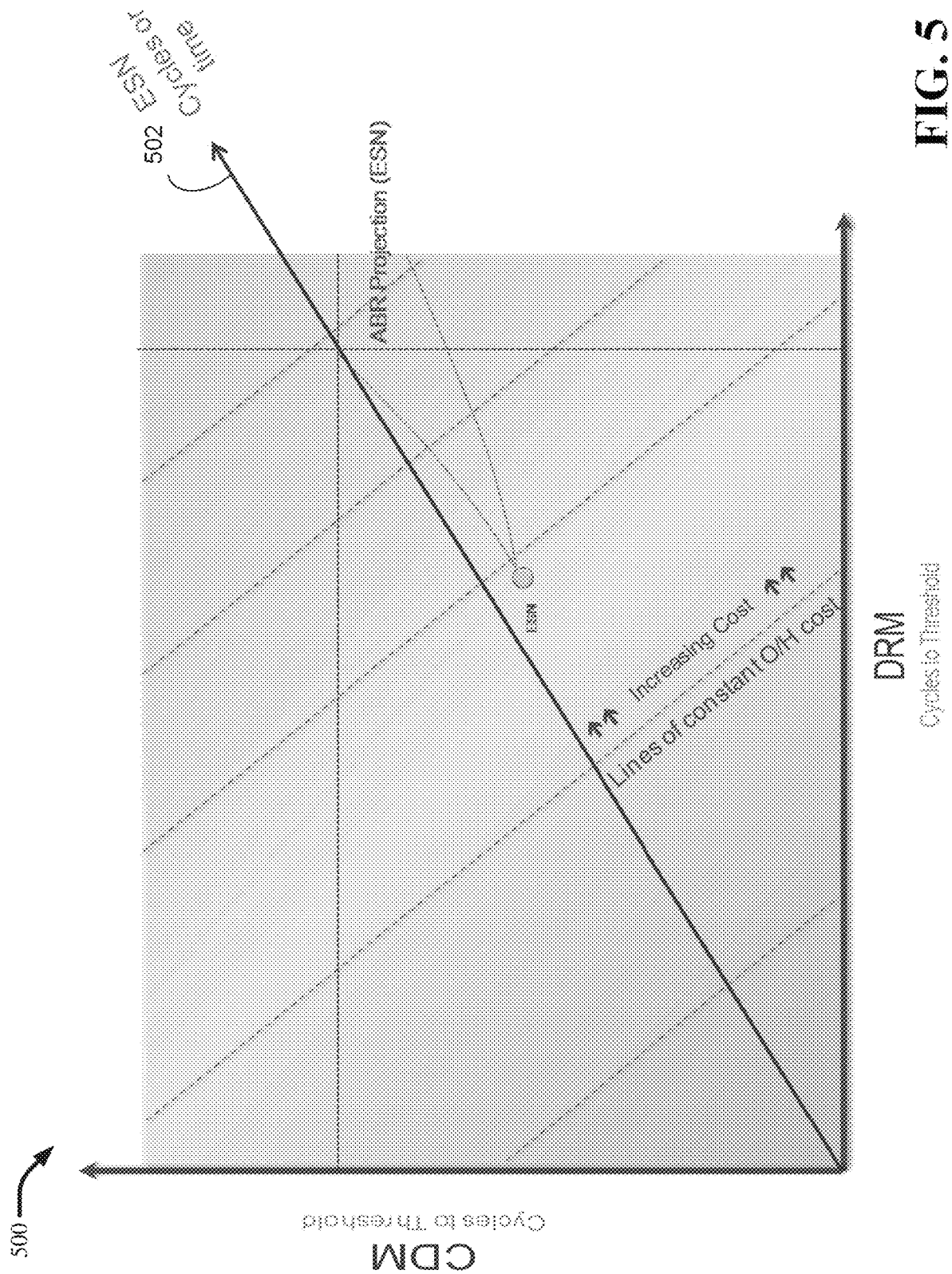
FIG. 5 illustrates an example, non-limiting graph depicting removal projection in accordance with one or more embodiments described herein.
Figure 6:
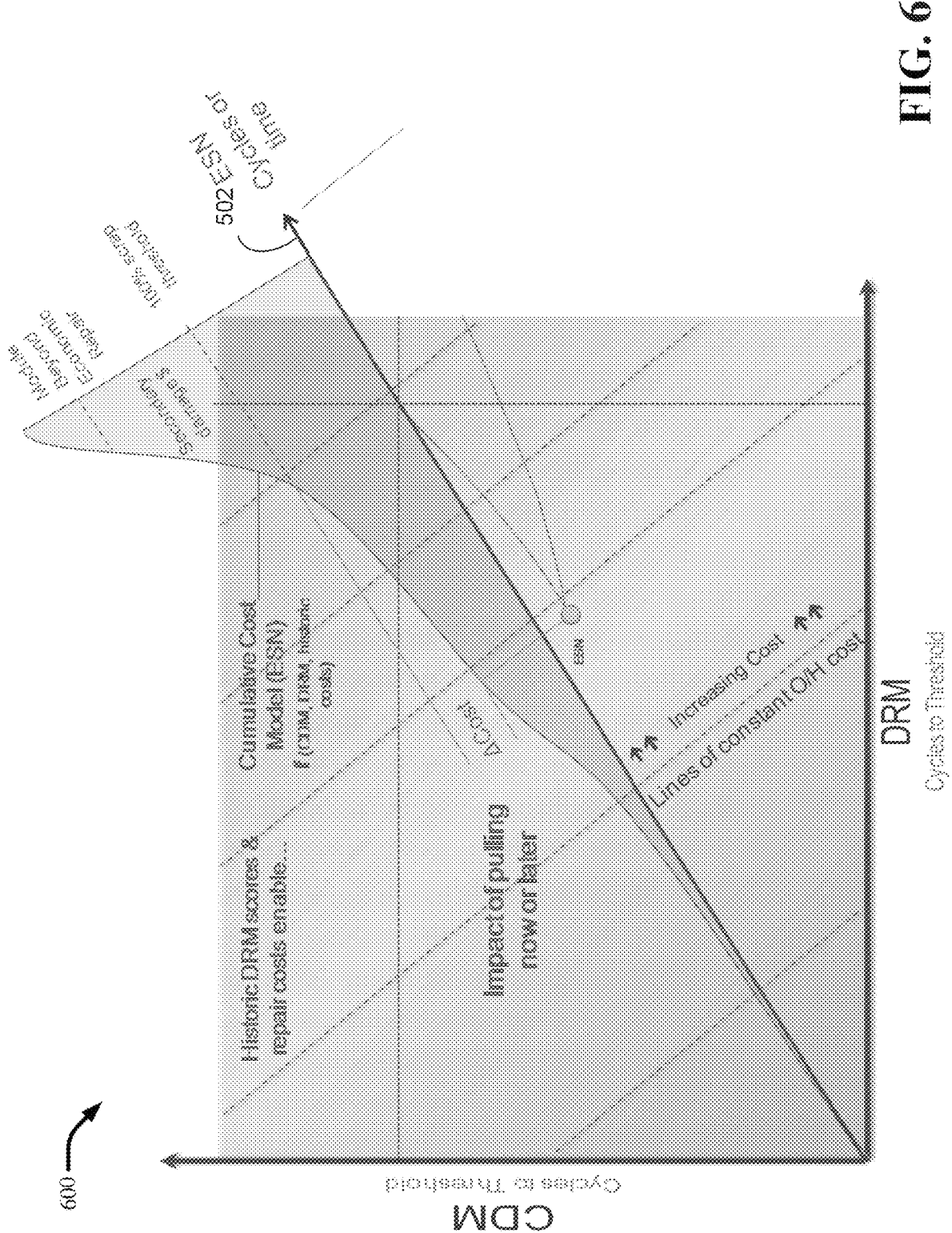
FIG. 6 illustrates an example, non-limiting graph depicting forecasting of delta cost in accordance with one or more embodiments described herein.
Figure 7:
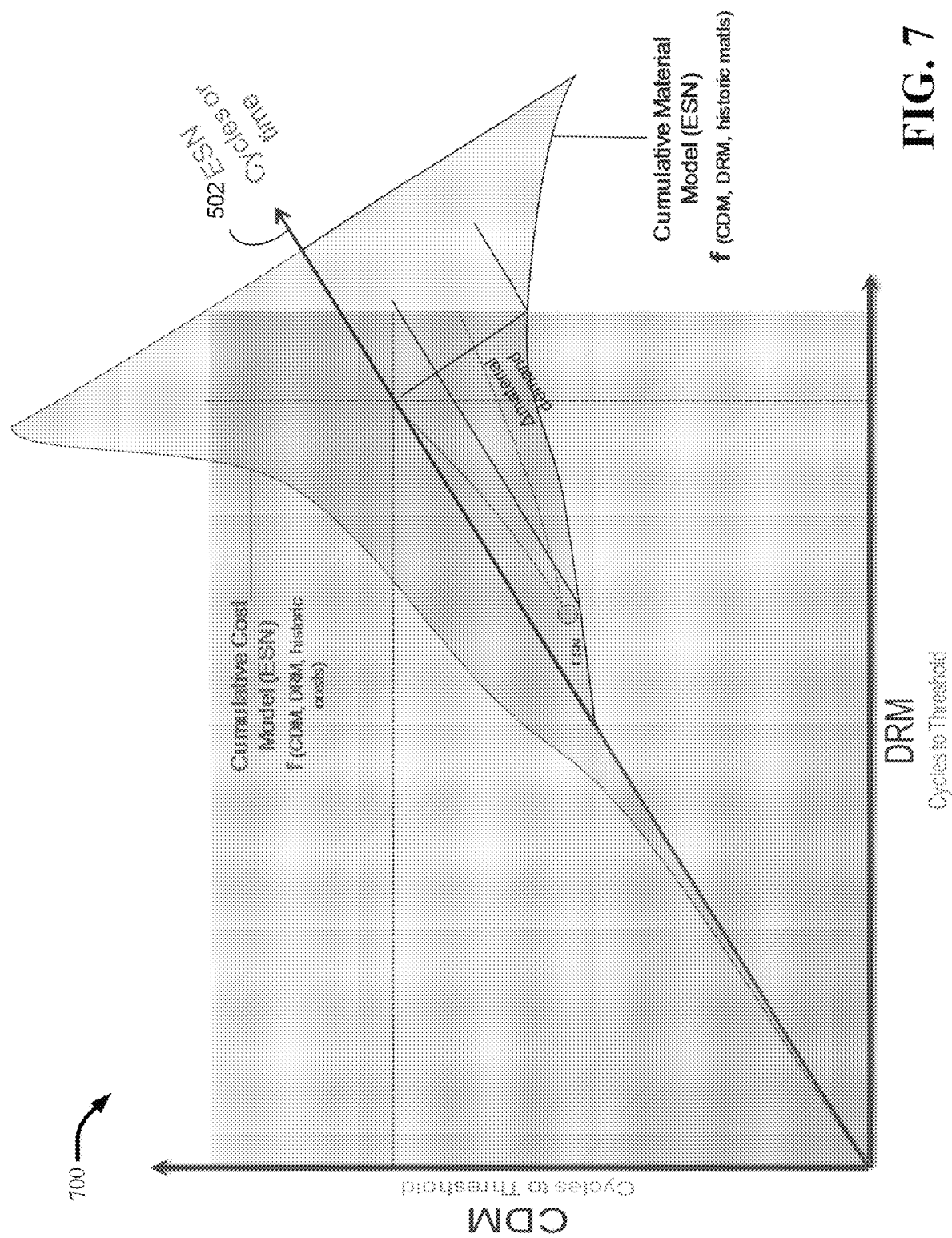
FIG. 7 illustrates an example, non-limiting graph depicting forecasting of delta material demand in accordance with one or more embodiments described herein.

FIG. 4 illustrates an example, non-limiting scatter diagram 400 of CDM cycles to threshold versus DRM cycles to threshold. FIG. 5 through FIG. 7 are illustrations of the same graph as FIG. 4 with a single ESN as the main focus. Each dot on the scatter diagram 400 represents an ESN. Over time, these ESNs tend to move in a direction towards both the CDM and DRM thresholds. These CDM and DRM thresholds are recommended inspection thresholds. Crossing these recommended inspection thresholds means an engine or a part is recommended to be first inspected, ultimately leading toward a planned engine removal for service. As soon as that particular aircraft lands on ground, a borescope inspection can be performed to determine the condition of the engine or part that crossed the CDM and DRM thresholds. Other components can also be inspected at this time as well. These recommended inspection thresholds are one of the first stages to determine whether an engine needs to be removed or a part is close to end of life. The longer an ESN is flown, certain parts pass from a serviceable condition in which a part can be repaired and reused to a non-serviceable condition in which that part becomes scrap incurring extra costs. These ESNs move in a direction towards an area on the scatter diagram 400 indicating unscheduled engine repair (UER). The diagonal regions between both axes of the scatter diagram 400 indicate whether an ESN within respective regions are serviceable, non-serviceable or requiring UER. These diagonal regions or lines of serviceability indicate increasing costs as an engine cycles through time.

Employing these lines of serviceability, a new dimension of lines of constant O/H (overhaul) cost can be drawn as illustrated in FIG. 5. Lines of constant O/H cost depict increasing costs as an engine progresses through cycles or time. In this example, non-limiting graph 500, a sample ESN is projected to head in the direction of increasing costs as demonstrated with a line 502. The line 502 represents past and future damage progressions for a single ESN operated uniquely by one ore more customers. A removal projection or ABR projection is then calculated based on CDM and DRM score trending using a variety of deterministic and/or probabilistic methods to determine remaining number of cycles the same ESN has before it needs to be serviced or inspected.

A brand new part has a score of zero, and a failed part has a score of 100. If the recommended inspection threshold is set at 90%, an analysis can be conducted to determine the remaining number of cycles an engine or a part has until it reaches the recommended inspection threshold. The determination can be analyzed by comparing a current distress level of an engine or a part and what it would be at the recommended inspection threshold versus what it would be when it actually failed. By linking a distress score of an engine or a part to other engines or parts that have similar scores when they were removed from service, that data can forecast repair costs and material consumptions. For example, if an engine is serviced or inspected at a score of 70, and there are data to indicate that the other 52 engines that were serviced or inspected at that score, a correlation can be made to predict the costs and materials required to return that part to a serviceable condition. More specifically, for example, if an engine requires 56 high pressure turbine (HPT) blades to function, if it is pulled early enough, maybe one blade would be scrapped and maybe the other blades can be serviceable with repairs. If waited longer, these HPT blades go from one being scrapped to possibly 20, or possibly 40, to total scrap of the full set, and eventually causing secondary damage to other parts.

What having this information does is it opens a new dimension called cumulative cost model (CCM) as illustrated in FIG. 6 that can forecast a delta (Δ) cost. The CCM is a function of the CDM, DRM or other predictive distress models and historic costs including material consumptions because it is material consumption and labor that leads to the ultimate cost prediction. The graph 600 depicts a delta cost which is the cost difference between removing an engine for service or inspection now versus a later time or cycle. The delta cost between any two cycles can be calculated as well. The delta cost can be utilized to predict the costs expected to incur if an engine crosses an inspection threshold versus what it currently costs. If waited further, the sample ESN is predicted to move into a region that has secondary damage costs because other parts are failing as a result. Not to mention, there are other associated costs with an engine failure such as downtime cost, customer burden cost, etc. If a customer all of a sudden has an UER and does not have any spare parts to repair the engine, that customer can lose revenue. The CCM and the delta cost can eliminate unplanned downtime and predict the costs associated with either servicing or inspecting an engine now versus later.

The other dimension is a cumulative material model that can be employed to predict a delta (Δ) material demand, as illustrated in FIG. 7. The graph 700 depicts delta material demand, which is the difference in material consumption between servicing or inspecting an engine or a part now versus later. The delta material demand can be calculated between any two cycles. Material consumption is a significant element as some parts can be very expensive. The ability to analyze a scrap rate, or the rate at which parts become scrap, for a part enables forecasting what materials need to be ordered ahead of time. Material forecasting is especially significant as many parts take anywhere from several months to multiple years to procure given the complexity of individual parts. Material forecasting enables service facilities to have foresight to order parts a year or two in advance, which can help eliminate excess inventories of parts that is not in demand.

Figure 8:
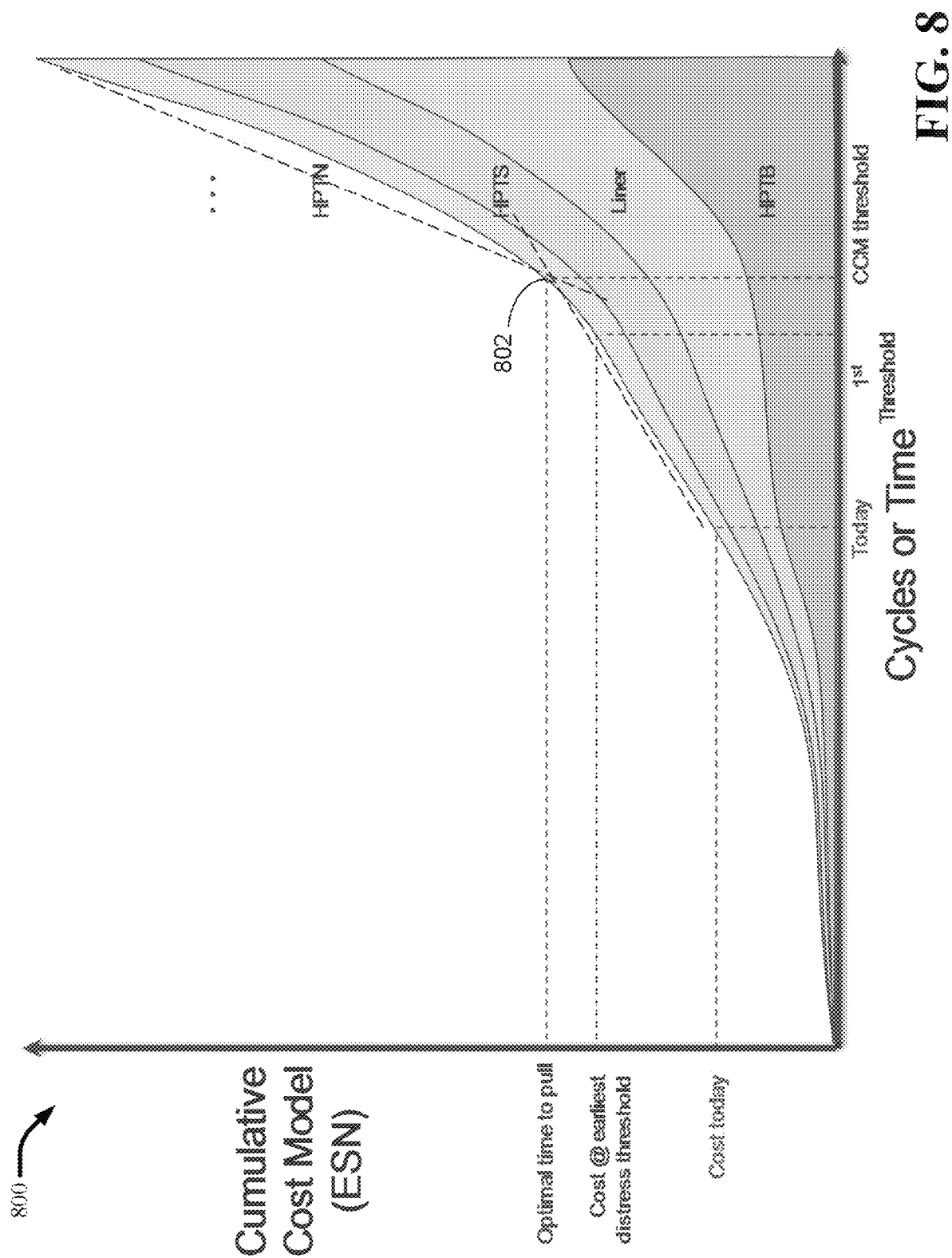
FIG. 8 illustrates an example, non-limiting graph depicting cost per cycle derivative in accordance with one or more embodiments described herein.

Further, an optimal time to pull one or more parts can be calculated by graphing the CCM against cycles or time as illustrated by the graph 800 in FIG. 8. The CDM and DRM can be employed to analyze the CCM over a number of cycles or time for multiple parts. The CCM data for multiple parts of an engine within an aircraft can be graphed together in one graph such as depicted in FIG. 8 for a sample ESN. In FIG. 8, the parts are HPTN (high pressure turbine nozzle), HPTS (high pressure turbine shroud), liner and HPTB (high pressure turbine blades). It is appreciated that additional parts can be analyzed to achieve a more accurate prediction of the CCM and CMM. The difference in costs associated between two cycles is the expected cost to incur if service or inspection is delayed. The inflection point 802 represents a shift from one lower cost per cycle derivative to a higher derivative, enabling identification of an optimal time to pull. The cost per cycle derivative enables an owner to optimize between time on wings (TOW) versus the cost to maintain that part or asset.

Predicting the optimal time to service or inspect a part can save other parts from receiving secondary damage as parts can be interdependent, and the failure of one can affect the others. For example, assume that based on a distress model, the turbine blades are the most limiting (e.g., meaning that the turbine blades are projected to be the first to drive an ESN removal). If the turbine blades are flown too long and it fails, the turbine blades that fail and crack can release materials into the flow path causing secondary damage to other components. Not only will that cause a brand new set of blades, it can cause damage to the nozzle right behind it as well as the blades right behind the nozzle. So now instead of having to replace one part, three sets of parts need to be replaced, which is almost an exponential cost increase.

Figure 9:
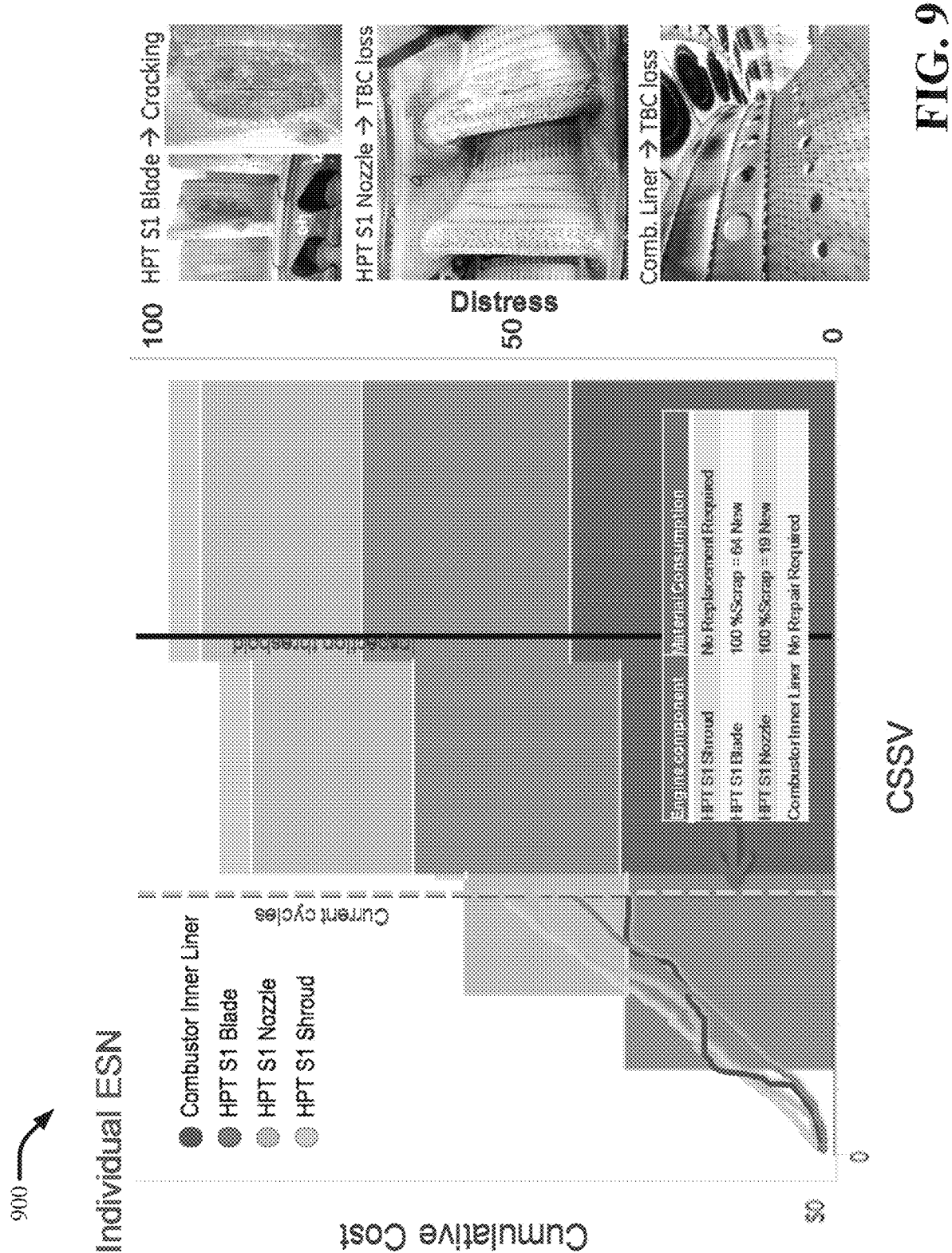
FIG. 9 illustrates an example, non-limiting graph depicting how cumulative cost compares to cumulative distress in accordance with one or more embodiments described herein.

Alternatively, the CCM can be graphed as illustrated in FIG. 9. The graph 900 demonstrates how cumulative cost compares with cumulative distress through increasing cycles since shop visit (CSSV) (e.g., cycles since maintenance or cycles consumed) for an individual sample ESN. As the CSSV increase, the cumulative cost and cumulative distress also increase. Distress on a high pressure turbine stage 1 (HPT S1) blade can mean cracking of the blade. An HPT S1 Nozzle and a combustor inner liner can have thermal barrier coatings (TBC) loss due to stress. The number of cycles consumed or CSSV can be analyzed to predict the remaining number of cycles until the recommended inspection threshold. For example, the sample ESN shown has a number of cycles consumed and reaches inspection threshold at a predicted number of cycles, and the difference is the number of cycles remaining until it reaches the recommended inspection threshold.

Figure 10:
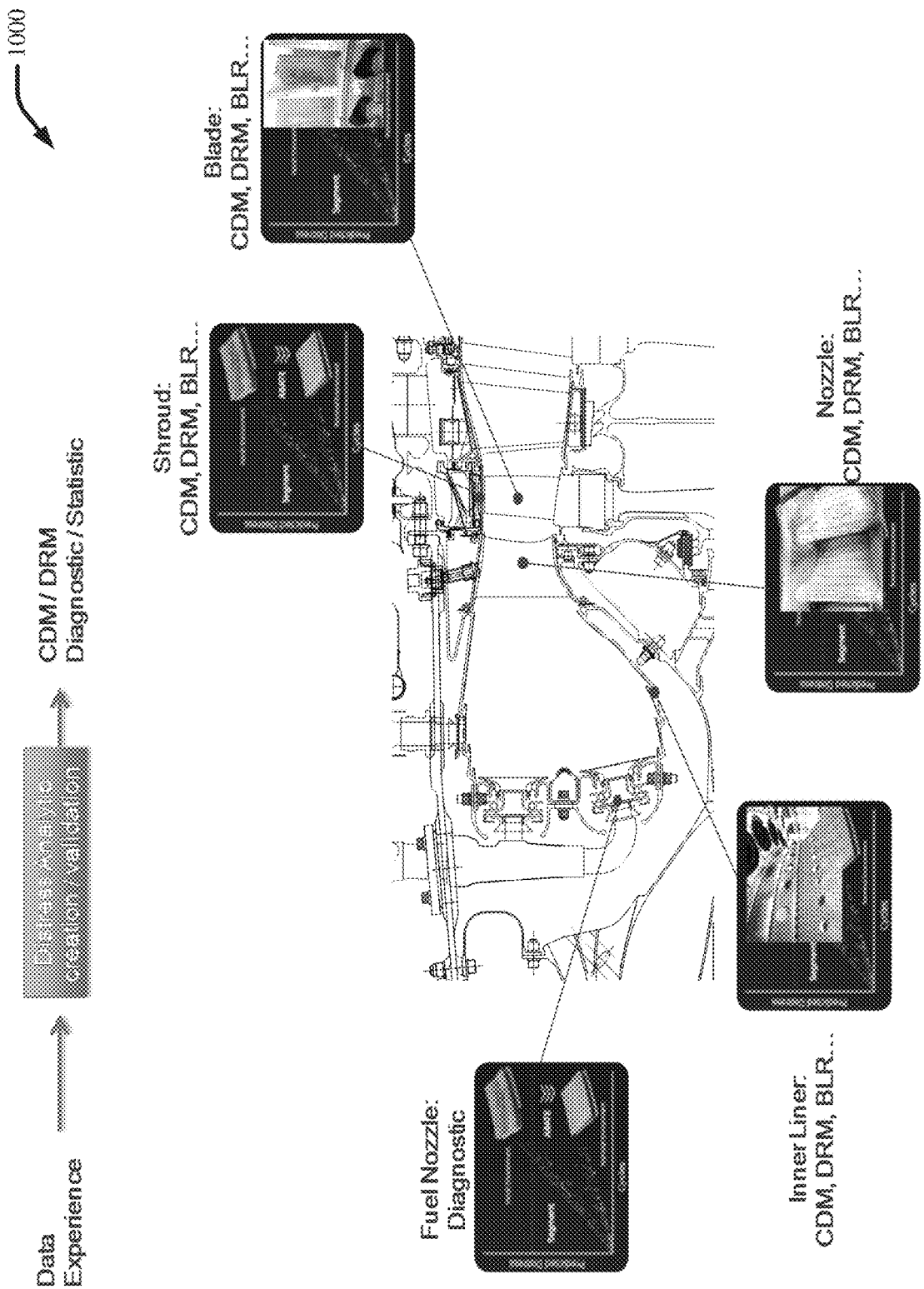
FIG. 10 illustrates example, non-limiting distress twins in accordance with one or more embodiments described herein.

Distress twins, which are digital twins, can be employed to build models to forecast maintenance cost and material consumption. The distress twins 1000 as illustrated in FIG. 10 are typically built for each component within an engine that are high in cost or drive an engine to overhaul. Nuts and bolts are not modeled. Turbine blades, turbine shrouds, turbine nozzles, fuel nozzle, inner liner, etc., are key components that cost the most and are modeled. The distress twins use data from a variety of sources including sensed parameters on the engine, derived parameters, operational, environmental, etc., to create digital representations of the distress state of respective components. Distress twins are created using a variety of physics, domain and data science methods as described above and are not limited only to the CDM and DRM methods. In FIG. 10, the distress twins 1000 (e.g., created using a variety of methods) characterize piece part, sub-system and/or system distress. It is appreciated that other types of data and/or failure modes can be monitored by utilizing distress twins.

Figure 11:
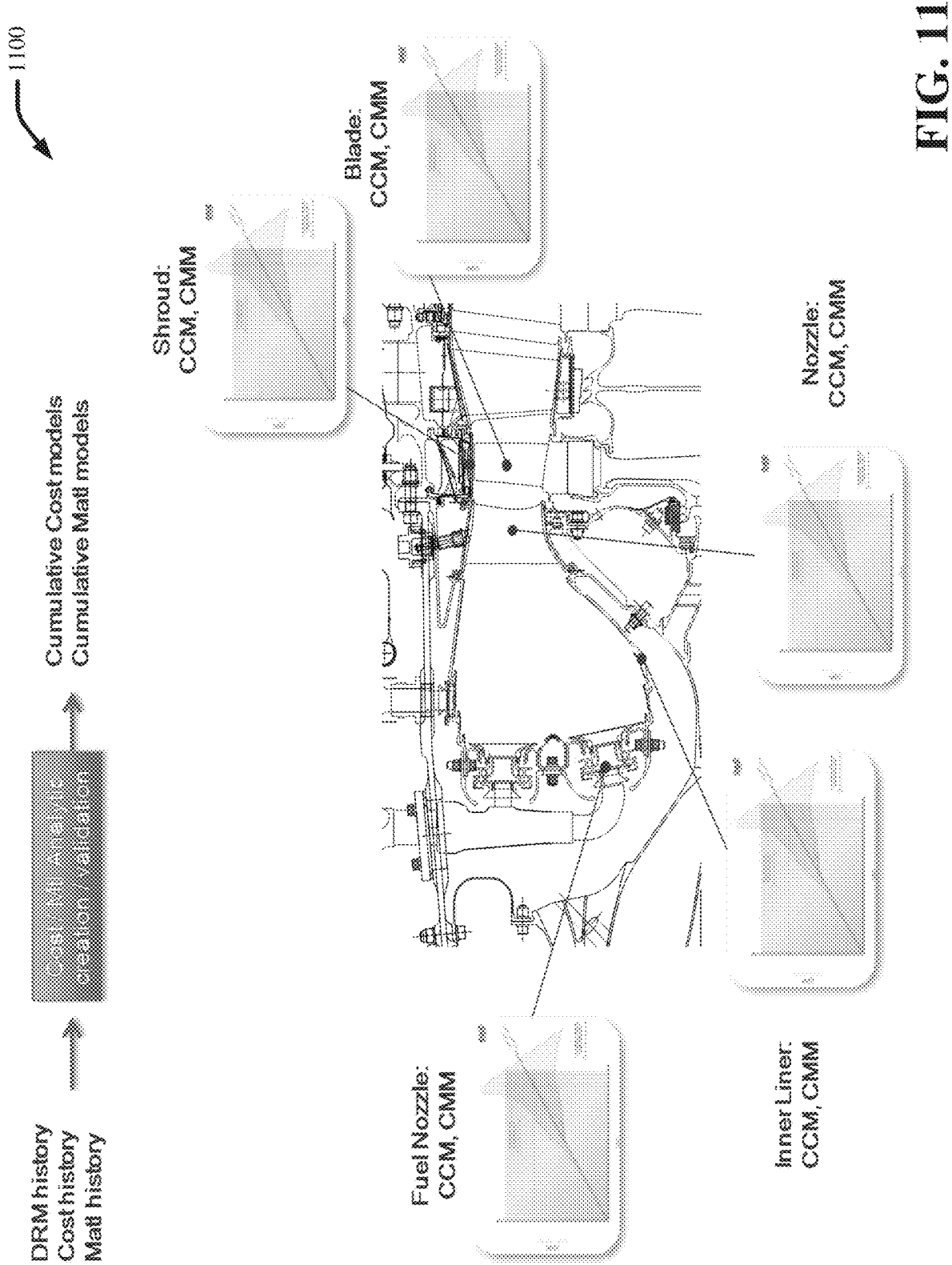
FIG. 11 illustrates an example, non-limiting process for building cumulative cost model and cumulative material model in accordance with one or more embodiments described herein.
Figure 12:
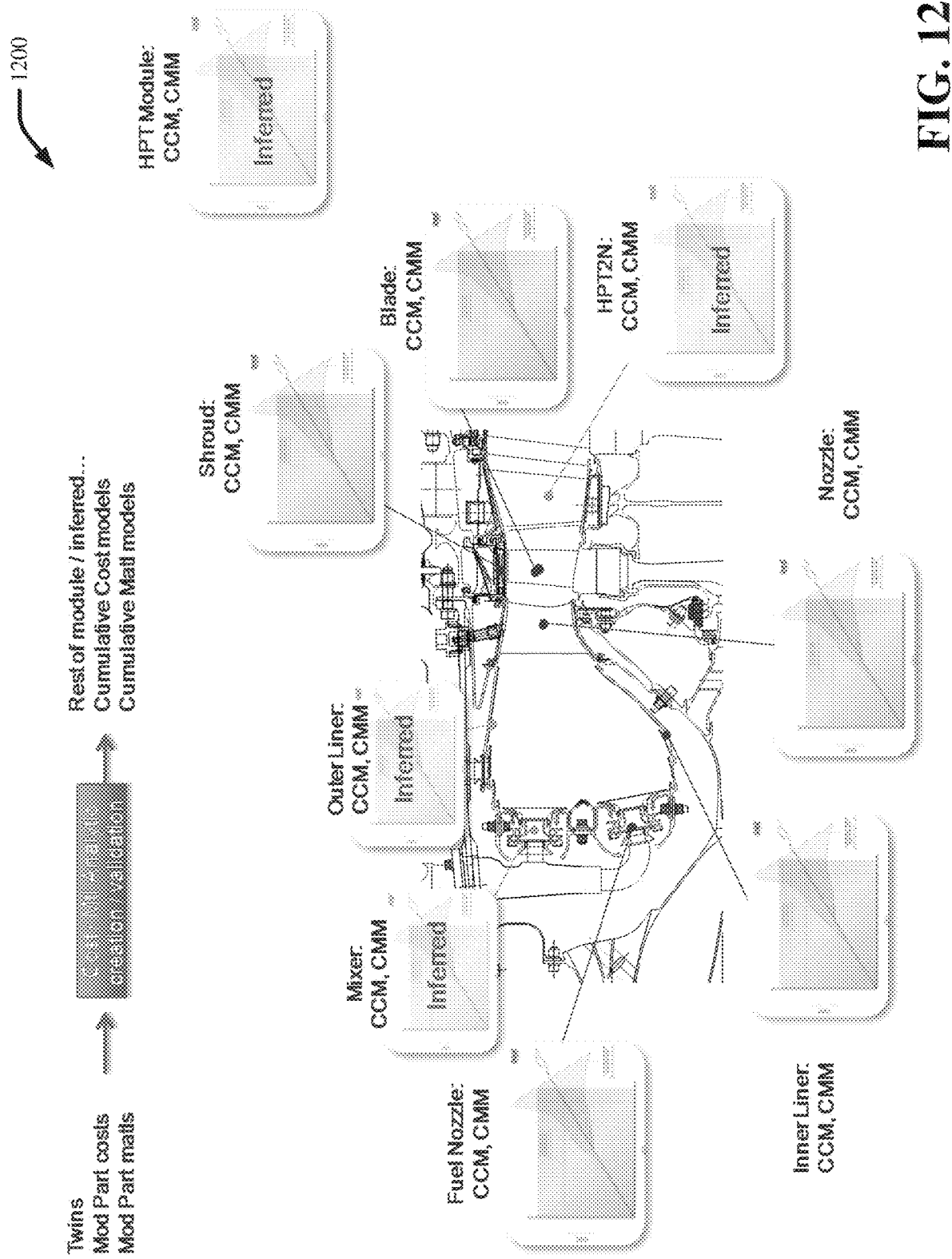
FIG. 12 illustrates an example, non-limiting process for developing inferred cumulative cost model and cumulative material model in accordance with one or more embodiments described herein.
Figure 13:
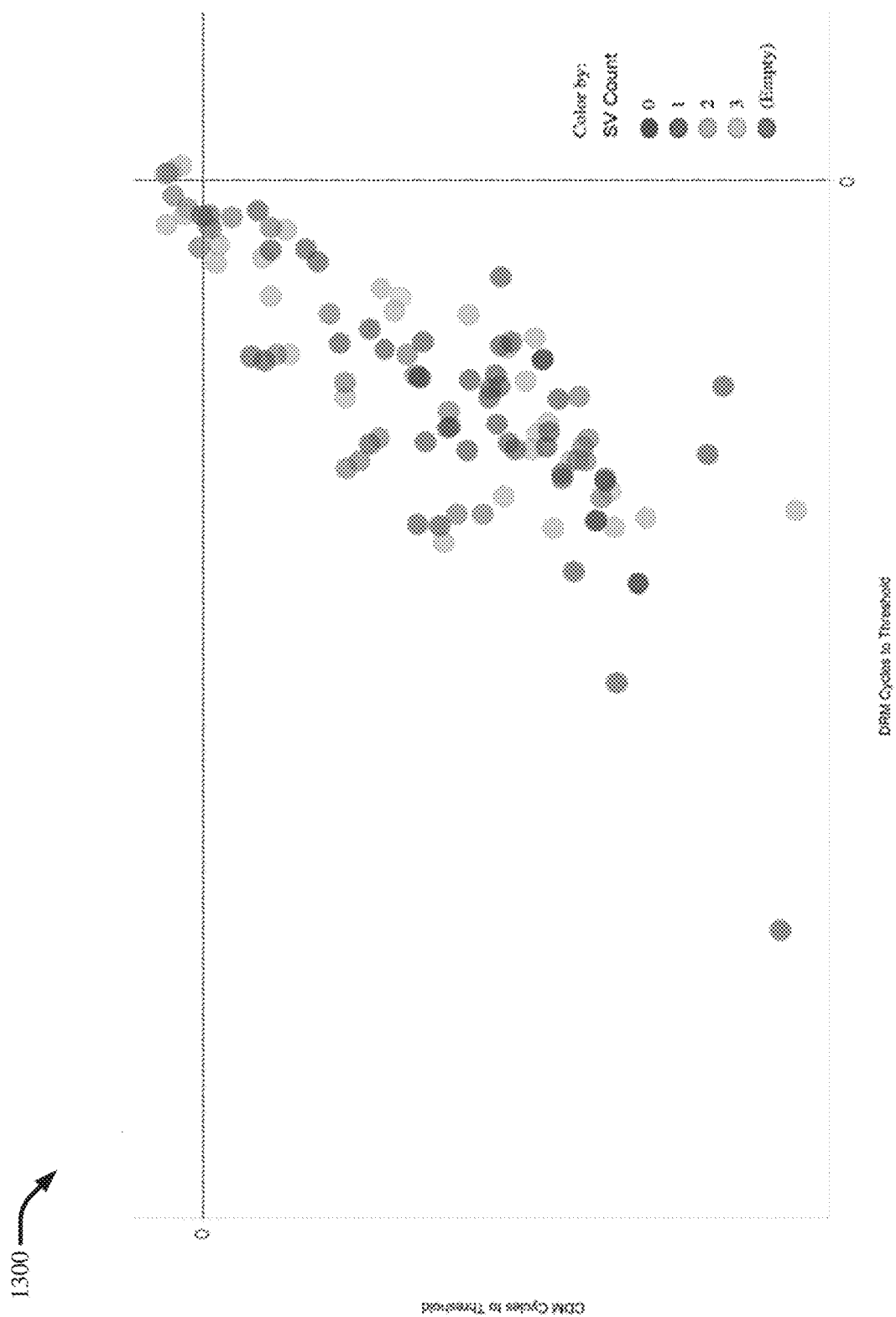
FIG. 13 illustrates an example, non-limiting scatter diagram depicting a digital solution employing cumulative damage model cycles to threshold versus distress ranking model cycles to threshold trajectory in accordance with one or more embodiments described herein.

By linking historical data to actual data, the CCM and CMM can be modeled for respective components as illustrated in FIG. 11 for the process 1100. Once those reference models are generated, inferred models can be developed as illustrated in FIG. 12 for the process 1200. Inferred models can be constructed by linking the distress twin scores to the cost and material consumption history to infer additional cumulative cost and material models. Additional cost and material consumption are inferred based on other engines with similar distress scores. The inferred models enable forecasting of module cost and material demand over time for piece parts, sub-assemblies and/or assemblies that do not already have unique distress twins. FIG. 13 is an example, non-limiting scatter diagram 1300 depicting a digital solution employing data from distress twins to demonstrate the CDM cycles to threshold versus DRM cycles to threshold trajectory for respective ESNs.

Figure 14:
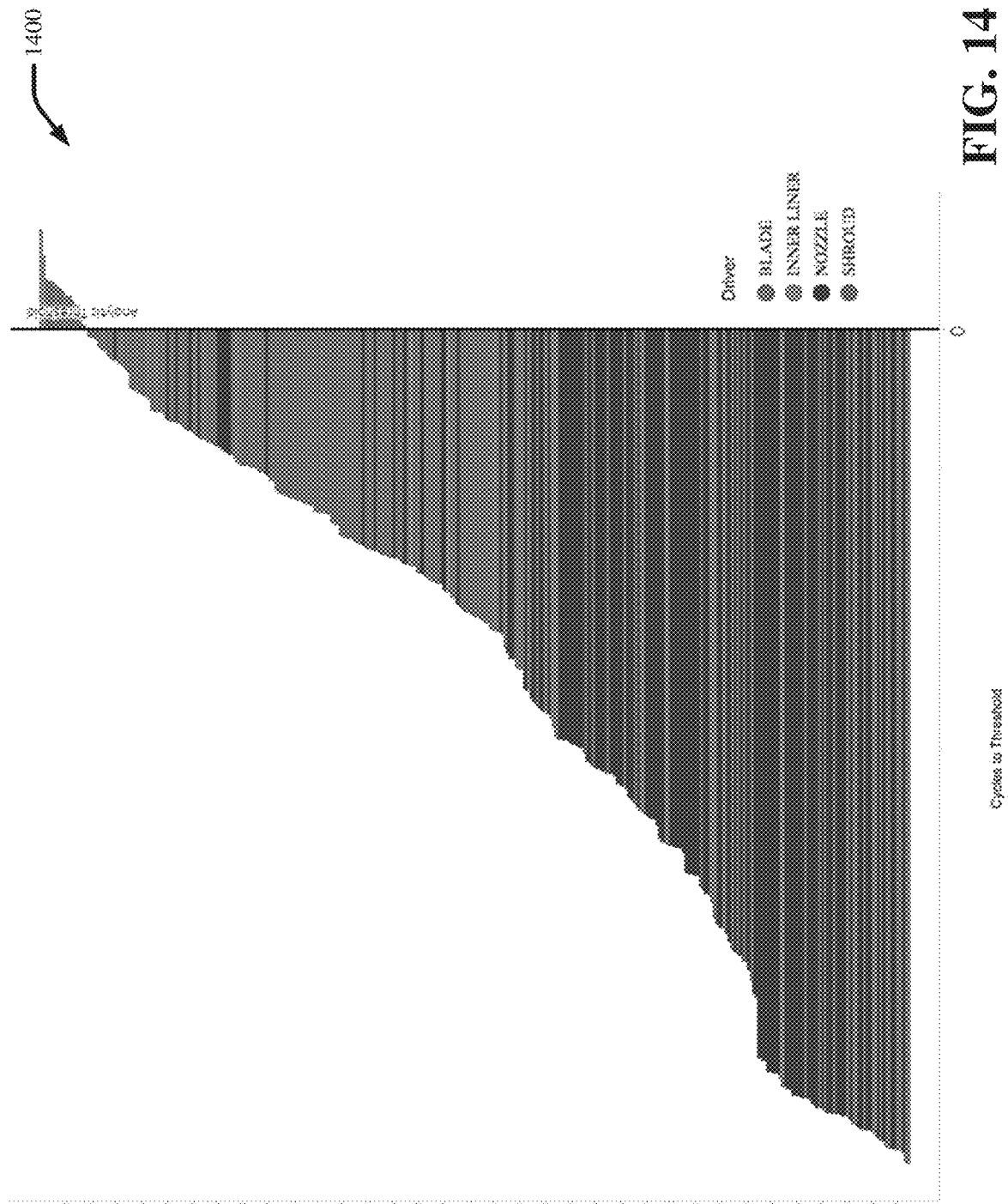
FIG. 14 illustrates an example, non-limiting graph depicting digital solution for ranking based on projected cycles to threshold in accordance with one or more embodiments described herein.
Figure 15:
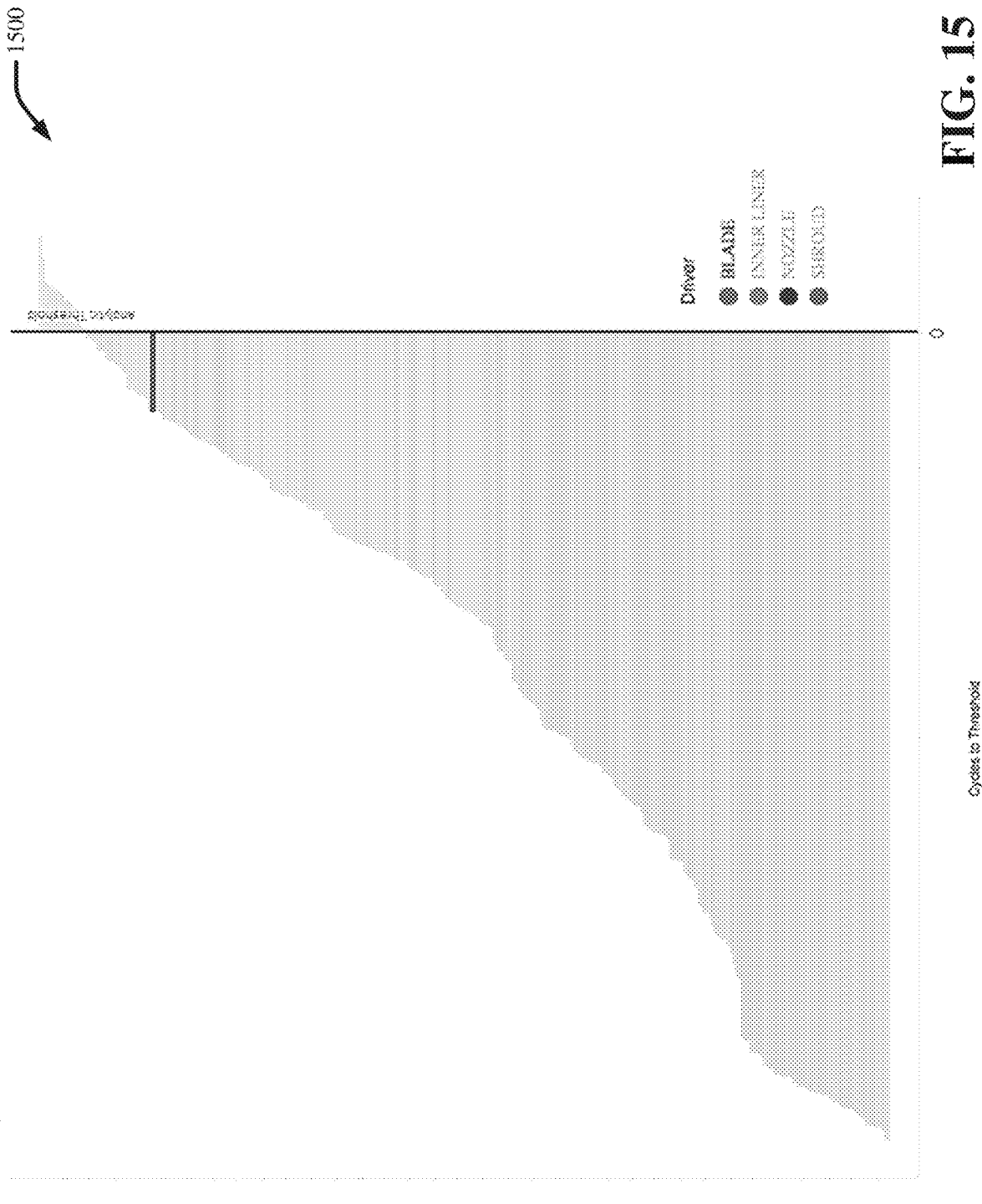
FIG. 15 illustrates an example, non-limiting graph depicting remaining cycles until threshold in accordance with one or more embodiments described herein.

In the same digital solution, each ESN can be ranked based on a projected time to threshold or recommended inspection threshold as in the graph 1400 as illustrated in FIG. 14. The graph 1400 enables prediction of the remaining useful life of key components within respective ESNs that are the most limiting based on the remaining cycles to threshold. Each ranked ESN can be isolated or selected as illustrated in the graph 1500 as illustrated in FIG. 15. The selected ESN depicts the number of cycles remaining until the recommended inspection threshold. In this example, the selected ESN has a number of cycles remaining until it reaches the recommended inspection threshold that is driven by the blade distress twin. The blade is the most limiting component for the selected sample ESN. After consuming the number of cycles remaining, an initial inspection would be conducted to avoid extra cost and UER risk. This information can be analyzed to determine how the remaining useful life and cost per cycle trend in order to optimize the removal timing to balance the cost per cycle as well as reducing unscheduled maintenance disruptions.

Figure 16:
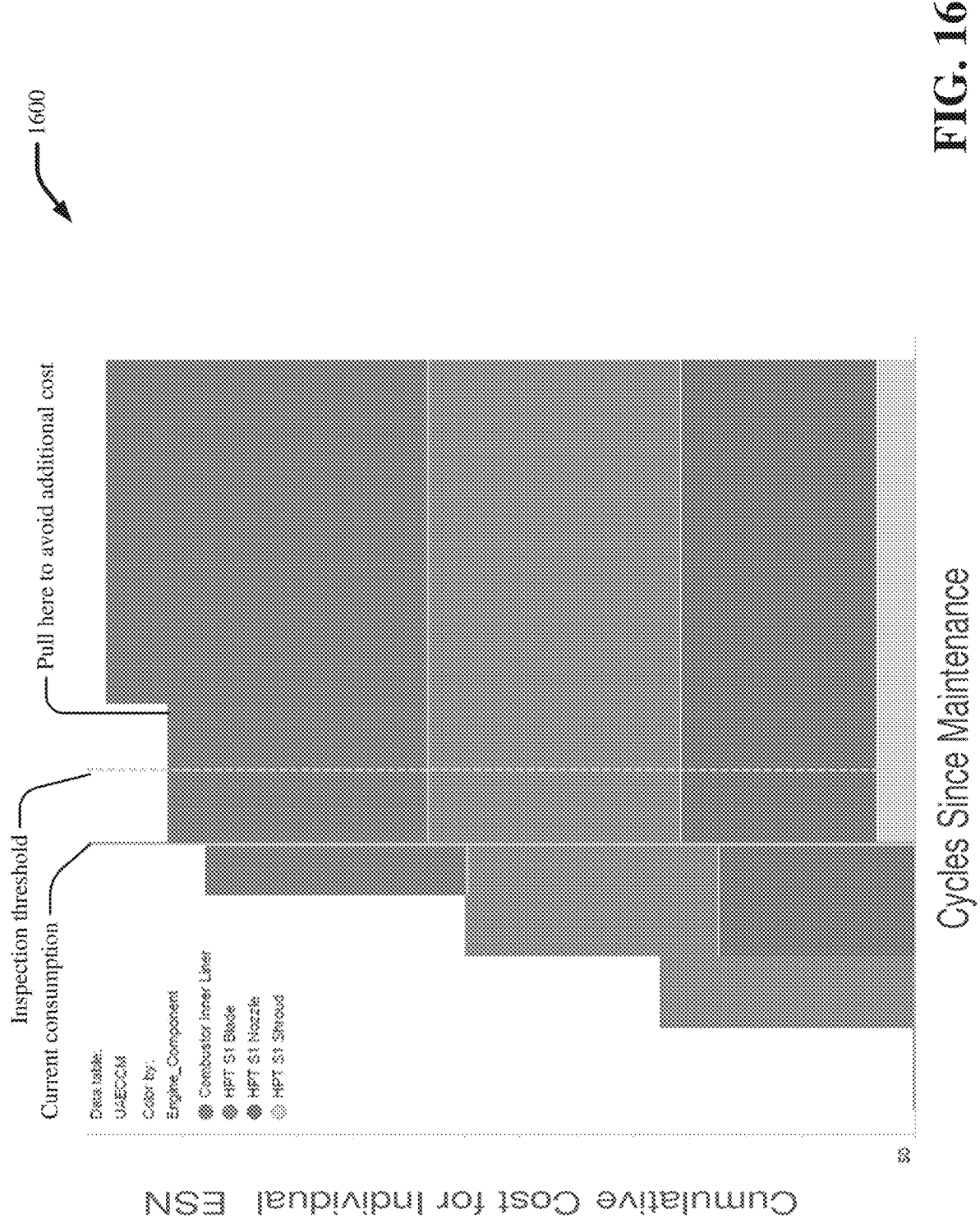
FIG. 16 illustrates an example, non-limiting graph depicting a digital solution to compare cumulative cost and material projections against remaining useful cycles in accordance with one or more embodiments described herein.

The ability to optimize removal timing is particularly useful because engines that are flown as long as possible end up costing abundantly more compared to when there are insights in terms of material consumption, cost consumption, maintenance burden, UER risk, etc., to better time removals. FIG. 16 illustrates an example, non-limiting graph 1600 depicting a digital solution to compare the cumulative cost and material projections against the remaining useful cycles. The graph 1600 illustrates real-time and future distress scores for multiple parts in a sample ESN linked to historic maintenance (e.g., material and cost). The graph 1600 enables optimization of the removal time and projected cost of maintenance per additional cycle operated. A coefficient of variance (CV) can be calculated to measure confidence in prediction. A CV of zero means 100% confidence.

For example, FIG. 16 illustrates that at the current consumption, the selected sample ESN has four parts that have cumulative cost and material models, although it is appreciated that more parts can be added. If the sample ESN were to be pulled at the current consumption, here is what it would cost. At the current consumption, the selected ESN has reached a plateau in terms of cost. That is, the cost at the first most limiting inspection threshold is roughly the same as at the current consumption. Now, if the selected ESN was flying at an earlier cycle since maintenance, there is an opportunity to save a substantial amount of money because this tool has enabled the insight to look at time on wings versus cumulative cost. Also, in this example graph 1600, the cost at the current consumption is the same as at other cycles since maintenance after the inspection threshold until the next cumulative cost level increase. If the selected ESN is pulled prior to reaching the next cumulative cost level increase, additional cost avoidance could be achieved. This digital solution forecasts cumulative cost with a measurement of confidence in prediction. For example, at the current consumption, the digital solution can analyze and predict the cost and level of reparability and/or scrap of individual parts as well as confidence in that prediction. Since the HPT S1 is 100% scrap in this example, the digital solution can generate a material estimation or cumulative material forecast indicating that a full set of new or used shrouds need to be ordered. If waited longer, here are how many more parts would need to be ordered and here are additional parts that are going to scrap and/or fail.

After a removal is planned using the distress twins to model distress, material, cost, etc., to drive analytics based work scoping for overall asset, materials can be ordered in advance. The CDM, DRM, CMM and CCM models optimize material forecasting and maintenance cost for each future cycle. The models enable predictive material forecasting in order to allow supply chain adequate time to respond, manufacture and deliver parts on time, which also reduces inventory and overhaul cost. The models also limit exposure to parts that do not require maintenance based on distress prediction of digital twins. The models also enable optimization of which components can employ used serviceable material (USM) instead of paying premium for new parts.

Figure 17:
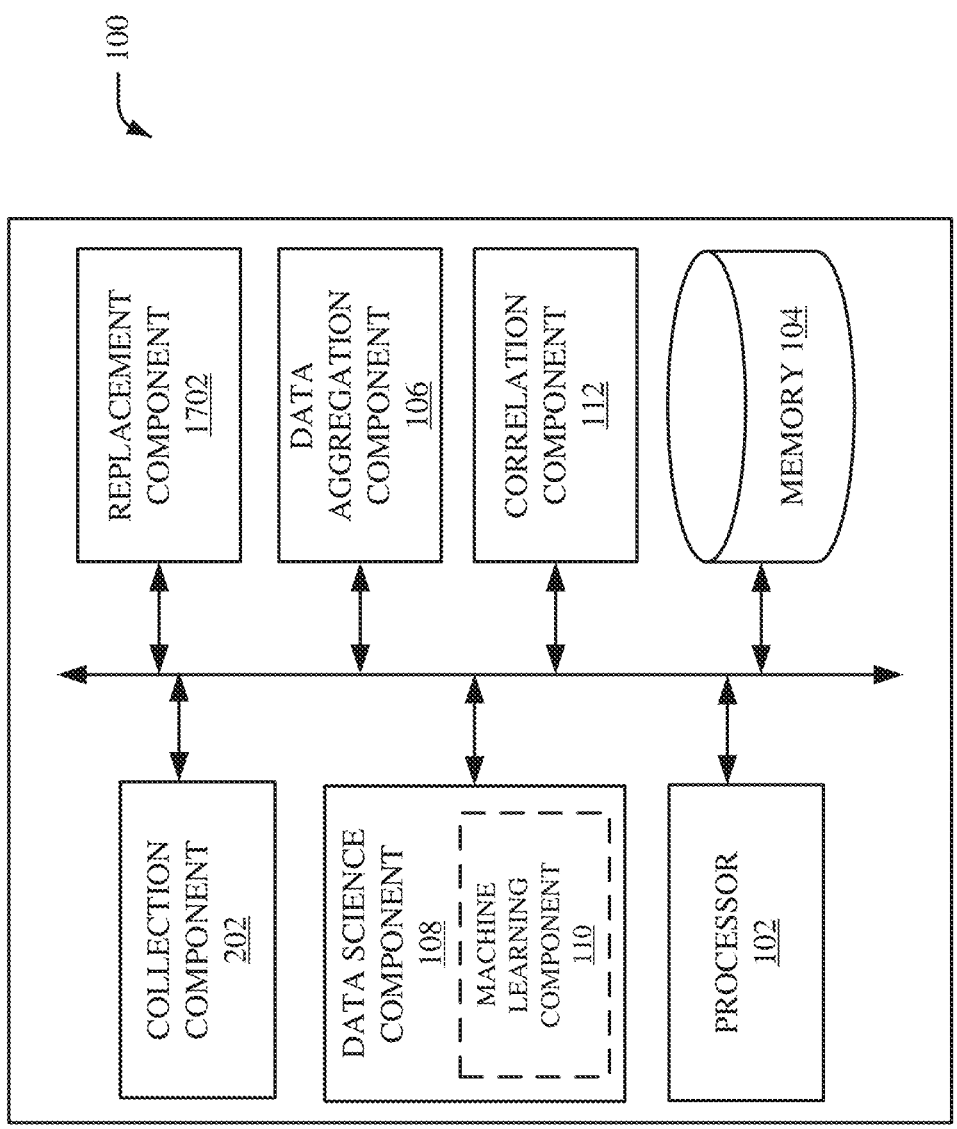
FIG. 17 illustrates a system that predicts asset maintenance cost(s) including a replacement component in accordance with one or more embodiments described herein.

Planned removal timing and material forecasting are beneficial for ordering replacement parts in advance as some parts may take up to several years to produce. As illustrated in FIG. 17, the system 100 can include the replacement component 1702. The replacement component 1702 enables ordering of materials to repair components back to a serviceable condition with a USM or a brand new part. The replacement component 1702 can optimize whether to repair or replace a part by applying a utility based analysis that factors in the predicted remaining life and compares the benefit of replacement at different CSSV against cost. As was illustrated in FIG. 8 that at the inflection point of a cost per cycle derivative is the optimal time to pull. The replacement component 1702 utilizes a time-based assessment of the CMM and CCM associated with the decision to replace components. Replacements can be ordered in advanced with sufficient time for delivery. For example, if a part takes eight months to make, the replacement component 1702 can place an order more than eight months in advance.

Figure 18:
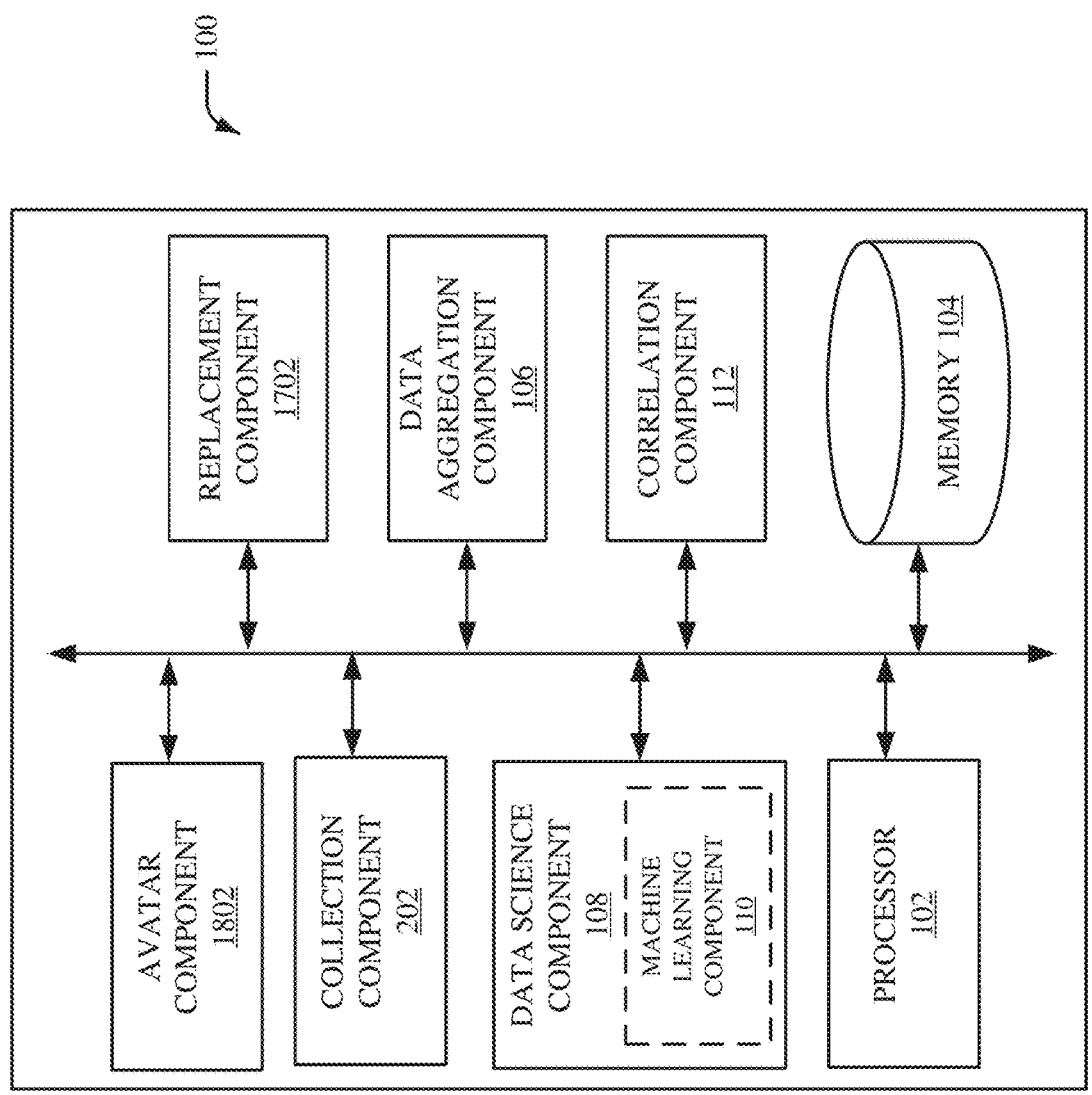
FIG. 18 illustrates a system that predicts asset maintenance cost(s) including an avatar component in accordance with one or more embodiments described herein.

An avatar component 1802 can be included in the system 100, as illustrated in FIG. 18, to interface with maintenance personnel and provide suggestions based on the outputs of the cumulative cost models. The avatar component 1802 can suggest based on the CCM whether to replace or repair a component with a USM or a premium new part. In some situations, it may be more cost effective to replace a part with a premium new part. Depending on which part is the most limiting and the number of cycles remaining until the next inspection threshold, it may be more cost effective to order a brand new replacement part.

Figure 19:
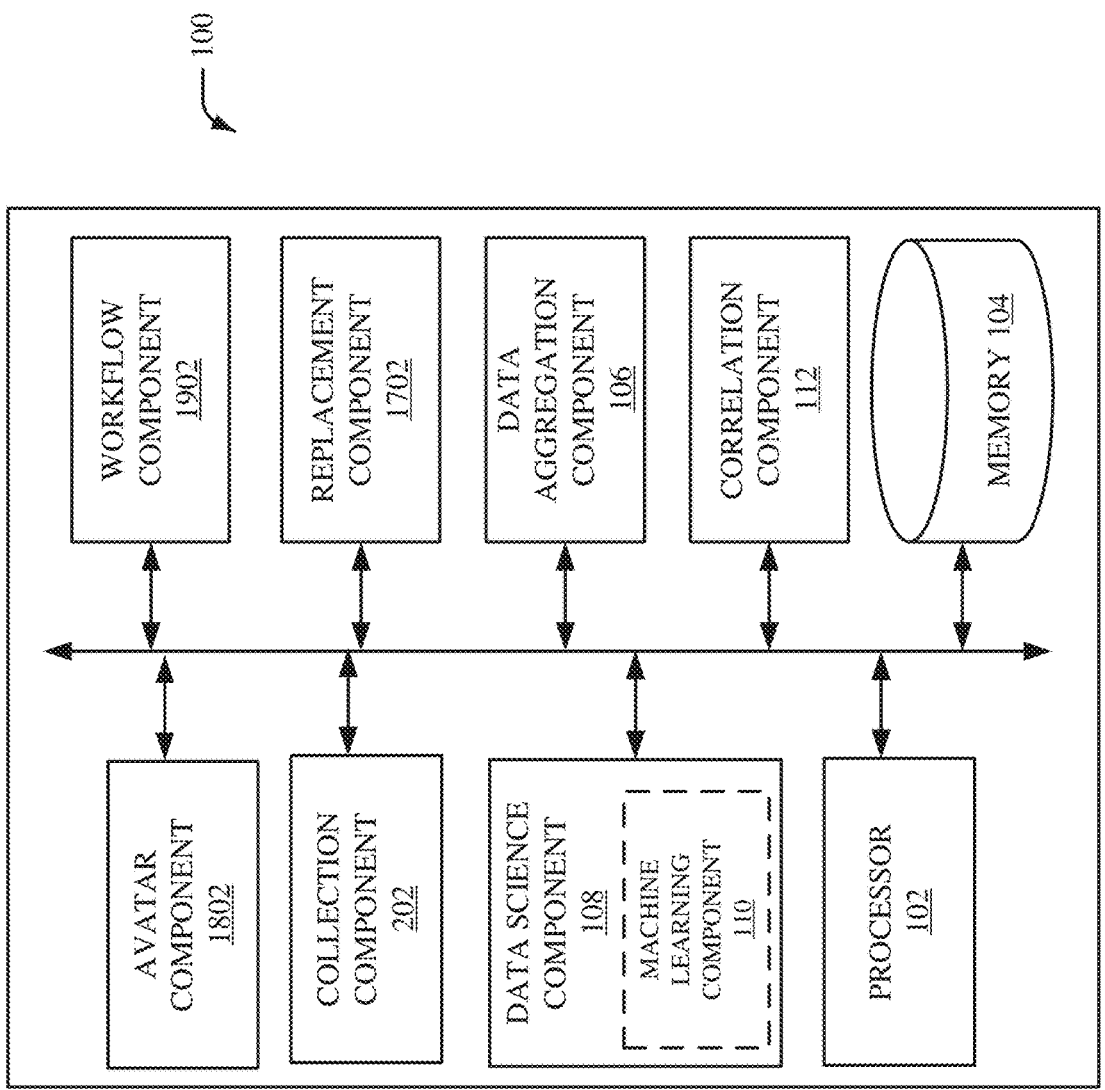
FIG. 19 illustrates a system that predicts asset maintenance cost(s) including a workflow component in accordance with one or more embodiments described herein.

FIG. 19 illustrates the system 100 including a workflow component 1902 that utilizes optimized removal timing, material demand forecasting and resultant maintenance costs to schedule material procurement and maintenance operations. The workflow component 1902 tracks removal timing, material demand forecast and maintenance costs. The workflow component 1902 can schedule material procurement determined by the replacement component 1702 as well as maintenance operations.

Figure 20:
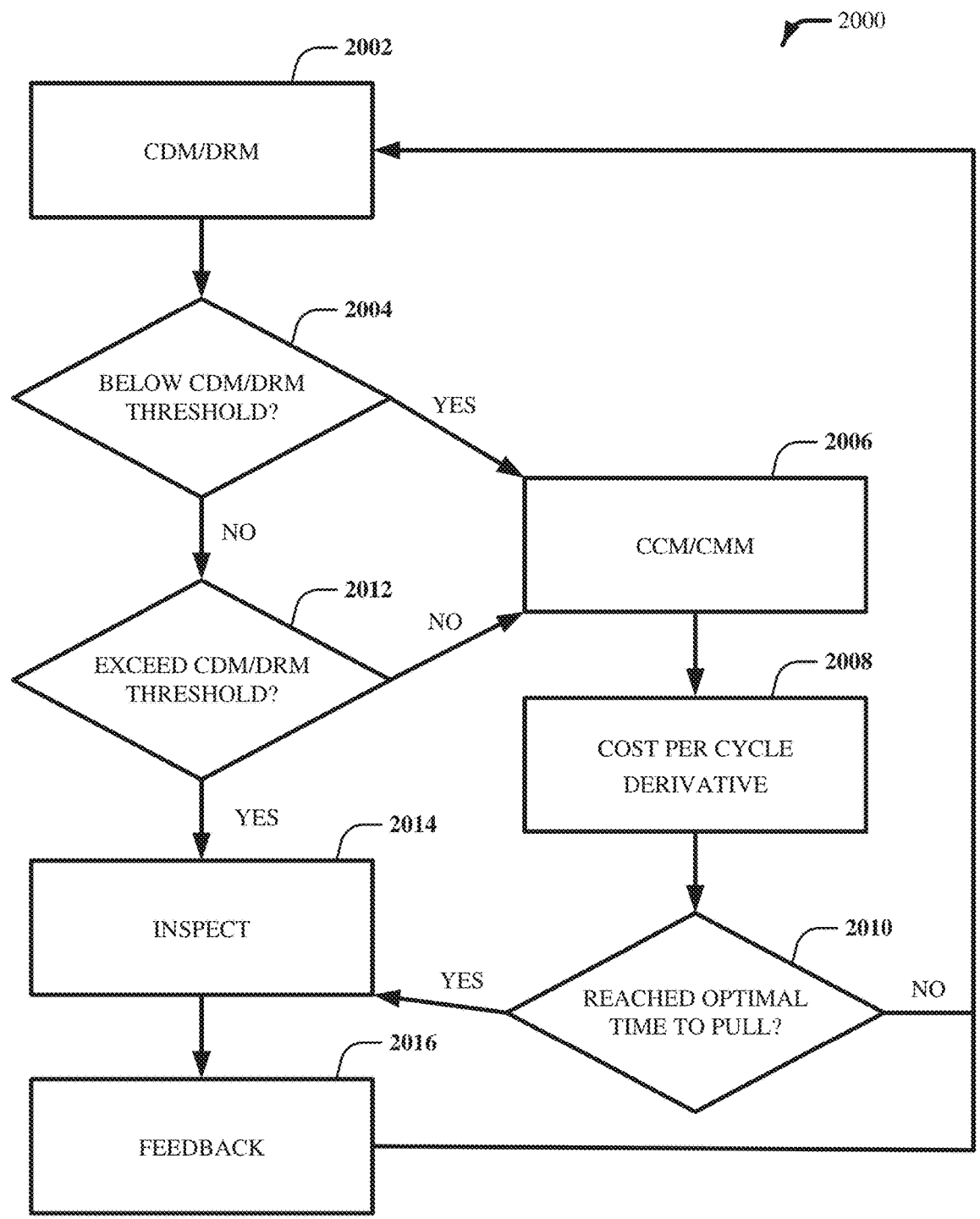
FIG. 20 illustrates an example, non-limiting method in accordance with one or more embodiments described herein.

FIG. 20 illustrates an example, non-limiting method 2000 to determine inspection threshold and generate inspection data. At 2002, the method 2000 can generate the CDM and DRM. At 2004, the method 2000 can determine whether the CDM and DRM are below inspection threshold. If yes, then at 2006, the method 2000 can generate the CCM and CMM. Then at 2008, the method 2000 can calculate cost per cycle derivative. Then at 2010, the method 2000 can determine whether optimal time to pull is reached based on cost per cycle derivative. If no, go back to 2002 and the method 2000 can continue generating the CDM and DRM. If yes, then at 2014, the method 2000 can perform an inspection. If at 2004 a determination is made that the CDM and DRM is not below the inspection threshold, then at 2012, the method 2000 can determine whether the CDM and DRM exceed the inspection threshold. If no, continue to 2006. If yes, then continue to 2014 and the method 2000 can perform an inspection. Then at 2016, the method 2000 can use the inspection data generated as feedback to improve the models as well as actions.

Figure 21:
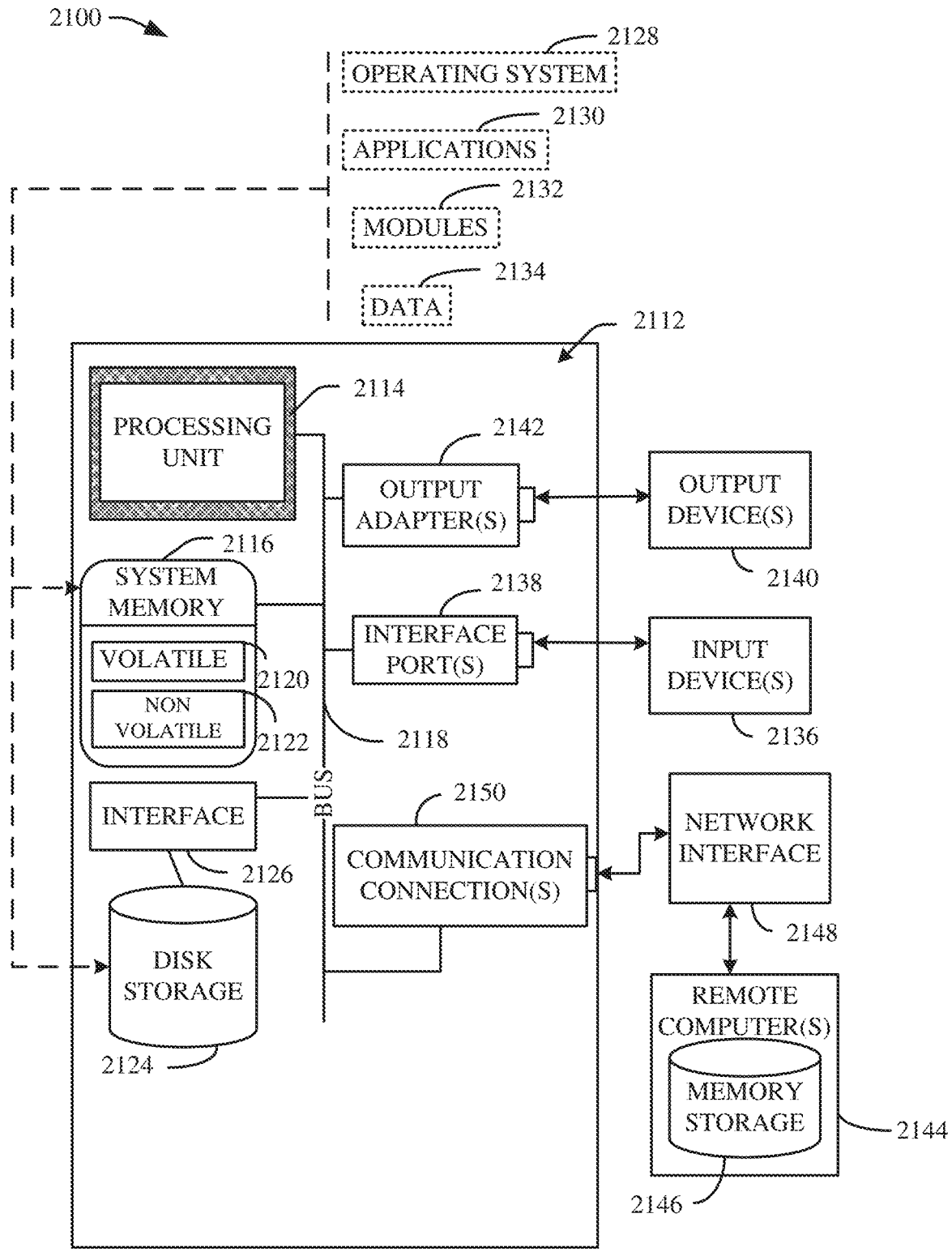
FIG. 21 illustrates a block diagram of an example, non-limiting operating environment in which one or more embodiments described herein can be facilitated.

In order to provide a context for the various aspects of the disclosed subject matter, FIG. 21 as well as the following discussion are intended to provide a general description of a suitable environment in which the various aspects of the disclosed subject matter can be implemented. FIG. 21 illustrates a block diagram of an example, non-limiting operating environment in which one or more embodiments described herein can be facilitated. Repetitive description of like elements employed in other embodiments described herein is omitted for sake of brevity.

With reference to FIG. 21, a suitable operating environment 2100 for implementing various aspects of this disclosure can also include a computer 2112. The computer 2112 can also include a processing unit 2114, a system memory 2116, and a system bus 2118. The system bus 2118 couples system components including, but not limited to, the system memory 2116 to the processing unit 2114. The processing unit 2114 can be any of various available processors. Dual microprocessors and other multiprocessor architectures also can be employed as the processing unit 2114. The system bus 2118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 2116 can also include volatile memory 2120 and nonvolatile memory 2122. The basic input/output system (BIOS), containing the basic routines to transfer information between elements within the computer 2112, such as during start-up, is stored in nonvolatile memory 2122. Computer 2112 can also include removable/non-removable, volatile/non-volatile computer storage media. FIG. 21 illustrates, for example, a disk storage 2124. Disk storage 2124 can also include, but is not limited to, devices like a magnetic disk drive, floppy disk drive, tape drive, Jaz drive, Zip drive, LS-100 drive, flash memory card, or memory stick. The disk storage 2124 also can include storage media separately or in combination with other storage media. To facilitate connection of the disk storage 2124 to the system bus 2118, a removable or non-removable interface is typically used, such as interface 2126. FIG. 21 also depicts software that acts as an intermediary between users and the basic computer resources described in the suitable operating environment 2100. Such software can also include, for example, an operating system 2128. Operating system 2128, which can be stored on disk storage 2124, acts to control and allocate resources of the computer 2112.

System applications 2130 take advantage of the management of resources by operating system 2128 through program modules 2132 and program data 2134, e.g., stored either in system memory 2116 or on disk storage 2124. It is to be appreciated that this disclosure can be implemented with various operating systems or combinations of operating systems. A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2114 through the system bus 2118 via interface port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port can be used to provide input to computer 2112, and to output information from computer 2112 to an output device 2140. Output adapter 2142 is provided to illustrate that there are some output devices 2140 like monitors, speakers, and printers, among other output devices 2140, which require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. The remote computer(s) 2144 can be a computer, a server, a router, a network PC, a workstation, a microprocessor based appliance, a peer device or other common network node and the like, and typically can also include many or all of the elements described relative to computer 2112. For purposes of brevity, only a memory storage device 2146 is illustrated with remote computer(s) 2144. Remote computer(s) 2144 is logically connected to computer 2112 through a network interface 2148 and then physically connected via communication connection 2150. Network interface 2148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 2150 refers to the hardware/software employed to connect the network interface 2148 to the system bus 2118. While communication connection 2150 is shown for illustrative clarity inside computer 2112, it can also be external to computer 2112. The hardware/software for connection to the network interface 2148 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc., that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon.

The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes computer-executable instructions stored in a memory, which cause the processor to:
receive data from a set of engine components;
estimate, based on the data, distress levels of the set of engine components and a number of distress-accelerating exposures experienced by the set of engine components;
generate a cumulative cost model (CCM) that forecasts a difference in cost between servicing the set of engine components at a current time and servicing the set of engine components at a later time, wherein the CCM is a function of the distress levels, the number of distress-accelerating exposures, and historic labor and material costs; and
schedule servicing for the set of engine components based on the CCM.

2. The system of claim 1, wherein the computer-executable instructions are further executable to cause the processor to:
generate a cumulative material model (CMM) that forecasts a difference in material consumption between servicing the set of engine components at the current time and servicing the set of engine components at the later time, wherein the CMM is a function of the distress levels, the number of distress-accelerating exposures, and historic material consumption; and
schedule material procurement for the set of engine components based on the CMM.

3. The system of claim 1, wherein the computer-executable instructions are further executable to cause the processor to:
perform recursive learning across subsets of the data to derive insights that enable predictive distress, material or cost models.

4. The system of claim 1, wherein the computer-executable instructions are further executable to cause the processor to:
enable ordering of replacement engine components based on analysis of the CCM.

5. The system of claim 1, wherein the computer-executable instructions are further executable to cause the processor to:
score and rank the set of engine components relative to respective distress levels.

6. The system of claim 1, wherein the computer-executable instructions are further executable to cause the processor to:
generate current or future expected removal timing.

7. The system of claim 1, wherein the computer-executable instructions are further executable to cause the processor to:
compute a cost per cycle derivative based on the CCM to optimize engine removal timing in order to maintain or improve engine component readiness while also maximizing engine component and portfolio value.

8. The system of claim 1, wherein the computer-executable instructions are further executable to cause the processor to:
collect and store data relative to maintenance costs including labor, material consumption, transportation costs, material availability, repair availability or available capacity.

9. A computer-implemented method, comprising:
receiving, by a device operatively coupled to a processor, data from a set of engine components;
estimating, by the device and based on the data, distress levels of the set of engine components and a number of distress-accelerating exposures experienced by the set of engine components;
generating, by the device, a cumulative cost model (CCM) that forecasts a difference in cost between servicing the set of engine components at a current time and servicing the set of engine components at a later time, wherein the CCM is a function of the distress levels, the number of distress-accelerating exposures, and historic labor and material costs; and
scheduling, by the device, servicing for the set of engine components based on the CCM.

10. The computer-implemented method of claim 9, further comprising:
- generating, by the device, a cumulative material model (CMM) that forecasts a difference in material consumption between servicing the set of engine components at the current time and servicing the set of engine components at the later time, wherein the CMM is a function of the distress levels, the number of distress-accelerating exposures, and historic material consumption; and
- scheduling, by the device, material procurement for the set of engine components based on the CMM.

11. The computer-implemented method of claim 9, further comprising:
- performing, by the device, recursive learning across subsets of the data to derive insights that enable predictive distress, material or cost models.

12. The computer-implemented method of claim 9, further comprising:
- enabling, by the device, ordering of replacement engine components based on analysis of the CCM.

13. The computer-implemented method of claim 9, further comprising:
- scoring and ranking, by the device, the set of engine components relative to respective distress levels.

14. The computer-implemented method of claim 9, further comprising:
- generating, by the device, current or future expected removal timing.

15. The computer-implemented method of claim 9, further comprising:
- computing, by the device, a cost per cycle derivative based on the CCM to optimize engine removal timing in order to maintain or improve engine component readiness while also maximizing engine component and portfolio value.

16. The computer-implemented method of claim 9, further comprising:
- collecting and storing, by the device, data relative to maintenance costs including labor, material consumption, transportation costs, material availability, repair availability or available capacity.

17. A computer program product for predicting maintenance costs or material consumptions, the computer program product comprising a non-transitory computer-readable storage medium having program instructions embodied therewith, the program instructions executable by a processor to cause the processor to:
- receive data from a set of engine components;
- estimate, based on the data, distress levels of the set of engine components and a number of distress-accelerating exposures experienced by the set of engine components;
- generate a cumulative cost model (CCM) that forecasts a difference in cost between servicing the set of engine components at a current time and servicing the set of engine components at a later time, wherein the CCM is a function of the distress levels, the number of distress-accelerating exposures, and historic labor and material costs; and
- schedule servicing for the set of engine components based on the CCM.

18. The computer program product of claim 17, wherein the program instructions are further executable to cause the processor to:
- generate a cumulative material model (CMM) that forecasts a difference in material consumption between servicing the set of engine components at the current time and servicing the set of engine components at the later time, wherein the CMM is a function of the distress levels, the number of distress-accelerating exposures, and historic material consumption; and
- schedule material procurement for the set of engine components based on the CMM.

19. The computer program product of claim 17, wherein the program instructions are further executable to cause the processor to:
- perform recursive learning across subsets of the data to derive insights that enable predictive distress, material or cost models.

20. The computer program product of claim 17, wherein the program instructions are further executable to cause the processor to:
- enable ordering of replacement engine components based on analysis of the CCM.

\* \* \* \* \*